United States Patent
Hedayat

(10) Patent No.: US 11,064,488 B2
(45) Date of Patent: *Jul. 13, 2021

(54) EFFICIENT DL OFDMA FREQUENCY SELECTIVITY HARVESTING

(71) Applicant: NEWRACOM, INC., Irvine, CA (US)

(72) Inventor: Ahmad Reza Hedayat, Irvine, CA (US)

(73) Assignee: ATLAS GLOBAL TECHNOLOGIES LLC, Frisco, TX (US)

( * ) Notice: Subject to any disclaimer, the term of this patent is extended or adjusted under 35 U.S.C. 154(b) by 529 days.

This patent is subject to a terminal disclaimer.

(21) Appl. No.: 15/884,252

(22) Filed: Jan. 30, 2018

(65) Prior Publication Data

US 2018/0176918 A1 Jun. 21, 2018

Related U.S. Application Data

(63) Continuation of application No. 14/818,214, filed on Aug. 4, 2015, now Pat. No. 9,907,073.

(60) Provisional application No. 62/112,095, filed on Feb. 4, 2015, provisional application No. 62/107,963, filed on Jan. 26, 2015, provisional application No. 62/089,121, filed on Dec. 8, 2014.

(51) Int. Cl.
| | | |
|---|---|---|
| *H04W 72/04* | (2009.01) | |
| *H04W 72/02* | (2009.01) | |
| *H04W 52/02* | (2009.01) | |
| *H04W 24/00* | (2009.01) | |
| *H04W 84/12* | (2009.01) | |

(52) U.S. Cl.
CPC ....... *H04W 72/0453* (2013.01); *H04W 24/00* (2013.01); *H04W 52/0229* (2013.01); *H04W 52/0245* (2013.01); *H04W 72/02* (2013.01); *H04W 84/12* (2013.01); *Y02D 30/70* (2020.08)

(58) Field of Classification Search
CPC ............. H04W 72/0453; H04W 24/00; H04W 52/0229; H04W 52/0245; H04W 72/02; H04W 56/00; H04W 84/12; Y02B 60/50; H04L 5/0007; H04L 5/00; H04L 1/18; H04L 5/0037
See application file for complete search history.

(56) References Cited

U.S. PATENT DOCUMENTS

| | | | | |
|---|---|---|---|---|
| 2012/0026909 A1* | 2/2012 | Seok | ................... | H04B 7/0617 370/252 |
| 2012/0039196 A1* | 2/2012 | Zhang | ................. | H04L 25/0398 370/252 |
| 2013/0058239 A1* | 3/2013 | Wang | .................. | H04L 25/0228 370/252 |
| 2013/0286959 A1* | 10/2013 | Lou | ....................... | H04L 5/0055 370/329 |
| 2014/0204891 A1* | 7/2014 | Park | ......................... | H04L 5/00 370/329 |

(Continued)

*Primary Examiner* — Oussama Roudani

(57) ABSTRACT

A method for communication in a wireless local area network comprises receiving a frame at a first device, the frame being transmitted by a second device. The method further comprises determining, by the first device using the frame, a channel strength for each of a plurality of sub-bands associated with a bandwidth of the frame. A sub-band of the plurality of sub-bands is selected based on the channel strength determinations made using the frame. The first and second devices communicate using the selected sub-band.

18 Claims, 12 Drawing Sheets

(56) References Cited

U.S. PATENT DOCUMENTS

2016/0119902 A1\* 4/2016 Cheong ................ H04W 48/12
370/329

\* cited by examiner

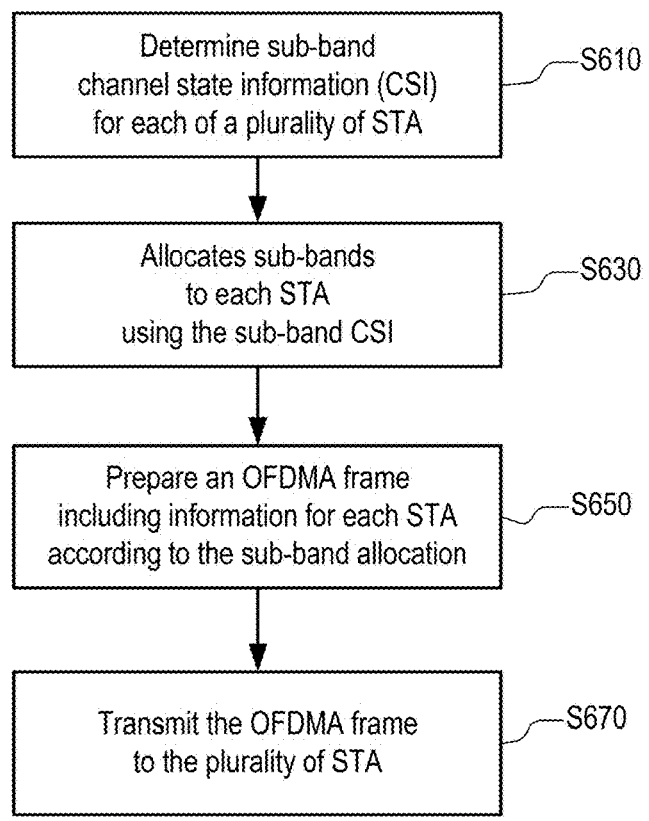
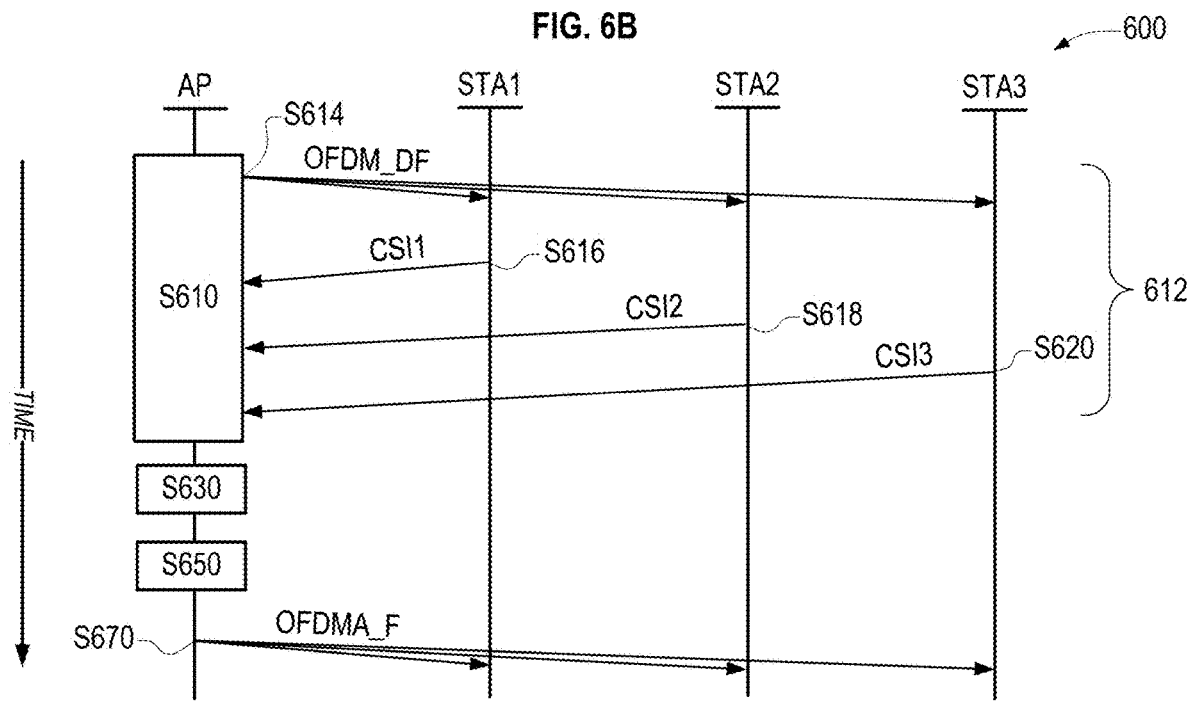

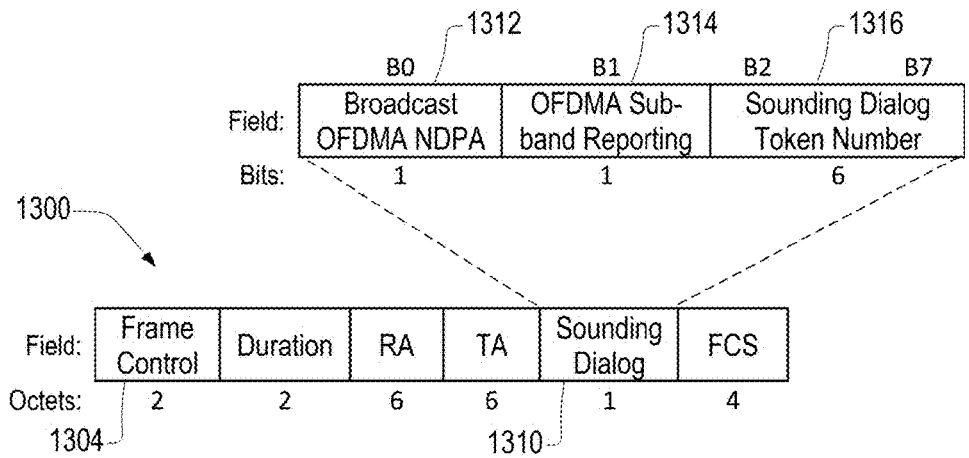
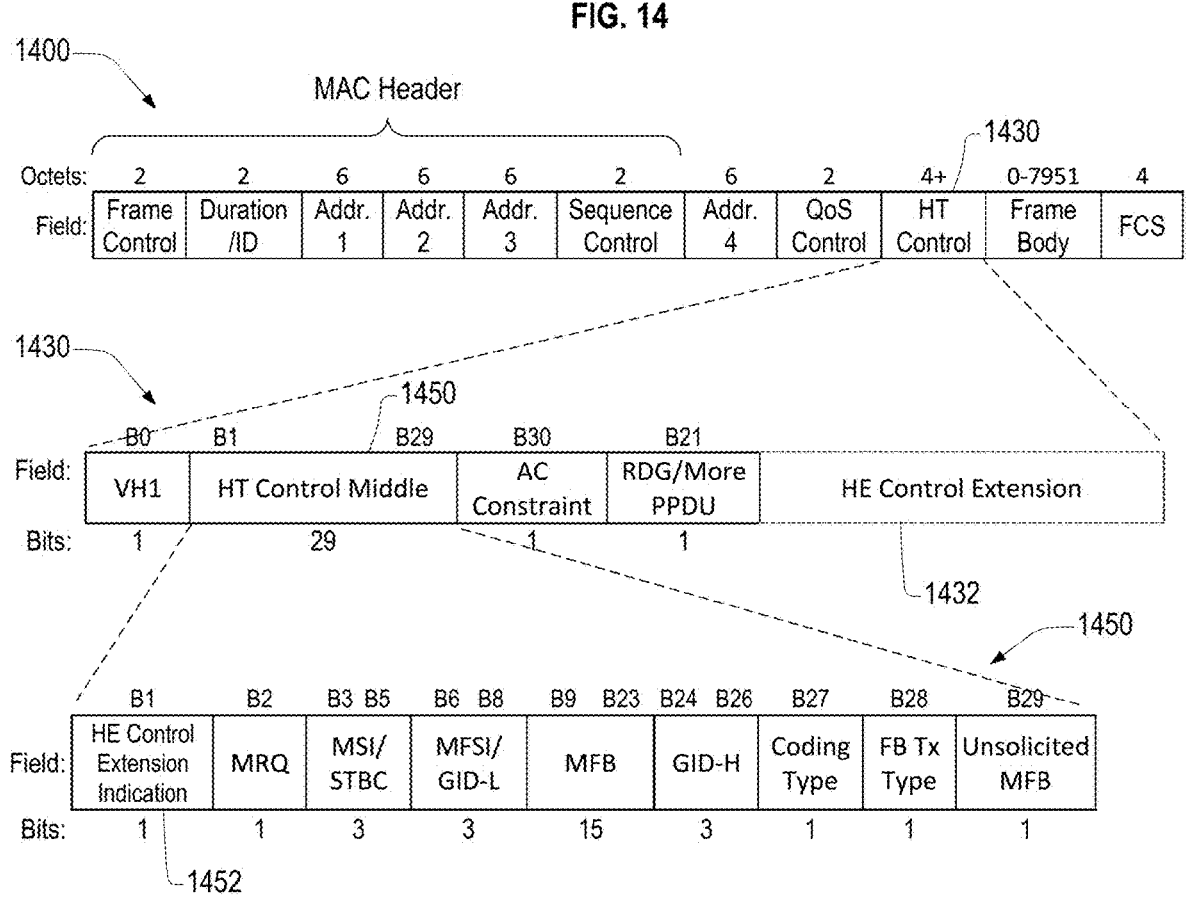

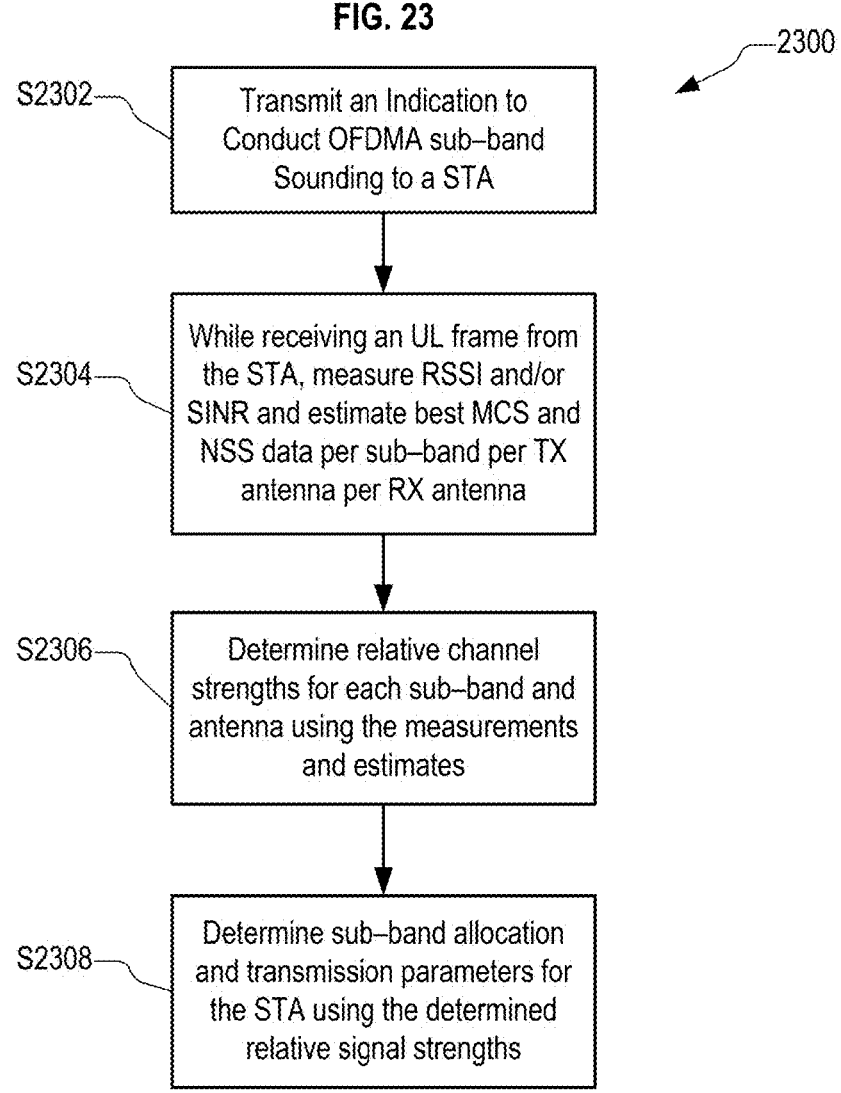

EFFICIENT DL OFDMA FREQUENCY SELECTIVITY HARVESTING

CROSS-REFERENCE TO RELATED APPLICATION

This application is a continuation of U.S. patent application Ser. No. 14/818,214, filed on Aug. 4, 2015, now U.S. Pat. No. 9,907,073, issued Feb. 27, 2018, which claims the benefit of U.S. Provisional Application No. 62/089,121, filed on Dec. 8, 2014, U.S. Provisional Application 62/107,963, filed on Jan. 26, 2015, and U.S. Provisional Application 62/112,095, filed on Feb. 4, 2015, the entire respective contents of which are incorporated herein by reference.

BACKGROUND

1. Technical Field

The technology described herein relates generally to wireless networking. More particularly, the technology relates generally to allocating frequency resources to each of a plurality of stations (STAs) in a Wireless Local Area Network (WLAN).

2. Description of the Related Art

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013. These standards are each hereby incorporated by reference herein in their entirety.

Recently, a high efficiency WLAN for enhancing system throughput in high-density scenarios is being developed by the IEEE 802.11ax task group. In such WLAN scenarios, a transmitting device may transmit an Orthogonal Frequency Division Multiple Access (OFDMA) frame having respective data for each of a plurality of receiving devices. Within the OFDMA frame, the respective data for the receiving devices may be transmitted in one more frequency region (sub-bands) respectively allocated to the receiving devices. Each sub-band includes a plurality of subcarriers at different frequencies.

The respective channels between the transmitting device and each of the receiving devices may be frequency selective, which means the channel magnitude changes over frequency. In the design of an OFDMA wireless network, it is possible to take advantage of the frequency selectivity of the channel. For instance, the transmitting device can schedule downlink (DL) transmission for several receiving devices within a downlink OFDMA PHY Protocol Data Unit (PPDU), where the information related to each receiving device is placed in the sub-band wherein the receiving device experiences higher channel magnitude.

The sub-bands that have a high channel magnitude for each receiving device may be determined in order to use sub-bands optimally.

SUMMARY

A method for communication in a wireless local area network comprises receiving a frame at a first device, the frame being transmitted by a second device, and determining, by the first device using the frame, a channel strength for each of a plurality of sub-bands associated with a bandwidth of the frame. The first and second devices communicate using a sub-band selected from the plurality of sub-bands, the sub-band being selected based on the channel strength determinations made using the frame.

In an embodiment, the first and second devices are part of a Basic Service Set (BSS), and the frame is an Orthogonal Frequency Division Multiplexing (OFDM) frame including an indication that the channel strengths are to be determined using the frame.

In an embodiment, the frame is a pre-announced frame, and the method further comprises receiving an announcement frame by the first device prior to receiving the pre-announced frame. The announcement frame indicates that the channel strengths are to be determined using the pre-announced frame.

In an embodiment, the announcement frame includes a Null Data Packet Announcement (NDPA) frame, and a Sounding Dialog Token field of the NDPA frame indicates that the channel strengths are for use in a subsequent OFDMA frame exchange.

In an embodiment, the first and second devices are part of a Basic Service Set (BSS), the first device being a station and the second device being an access point, and the announcement frame includes an indication that a group of one or more devices associated with the BSS are to determine respective channel strengths using the pre-announced frame.

In an embodiment, the announcement frame includes an indication of whether the first device is to transmit a report prepared according to the determined channels strengths in response to the pre-announced frame or transmit the report in response to a poll frame, or an indication that the report may be included in a field of a Medium Access Control (MAC) header of a subsequent frame transmitted by the first device.

In an embodiment, the announcement frame includes an indication of whether the first device is to transmit a report prepared using an average of channel strengths for a sub-band across multiple transmitting antennas, multiple receiving antennas, or combinations of multiple transmitting antennas and multiple receiving antennas.

In an embodiment, the method further comprises transmitting a sub-band channel state information (CSI) report indicating the channel strength for each of a set of sub-bands of the plurality of sub-bands to the second device by the first device. The selected sub-band is based on the sub-band CSI report received by the second device.

In an embodiment, the method further comprises transmitting a sub-band channel state information (CSI) report including a combined strength determined using channel strengths of the plurality of sub-bands. The selected sub-band is based on the combined strength.

In an embodiment, the method further comprises transmitting a sub-band channel state information (CSI) report including a channel strength measure determined using channel strengths of the plurality of sub-bands. The selected sub-band is based on the channel strength measure.

In an embodiment, the method further comprises transmitting a sub-band channel state information (CSI) report including a first channel strength of the channel strengths for the sub-bands only when the first channel strength is greater than a second channel strength of the channel strengths for the sub-bands, the first channel strength satisfies a predetermined criteria, the predetermined criteria relating to one or more of a Received Signal Strength Indication (RSSI), a Signal to Interference and Noise Ratio (SINR), a Modulation and Coding Scheme (MCS), and a Number of Spatial Streams (NSS), or a previous frame received from the second device includes an indication that the sub-band CSI report is to include the first channel strength.

In an embodiment, the method further comprises determining a sub-band channel state information (CSI) report according to one or more of the channel strengths, receiving, by the first device, a polling frame, and transmitting the sub-band CSI report in response to the polling frame.

In an embodiment, the method further comprises determining a sub-band channel state information (CSI) report according to one or more of the channel strengths, and transmitting the sub-band CSI report in response to the frame.

In an embodiment, the method further comprises determining a sub-band channel state information (CSI) report according to one or more of the channel strengths, and transmitting the sub-band CSI report in a field of a High Throughput (HT) Control field of a Medium Access Control (MAC) frame.

In an embodiment, the method further comprises determining a sub-band channel state information (CSI) report according to one or more of the channel strengths, and transmitting the sub-band CSI report in a management frame including an indication that the management frame includes the sub-band CSI report. The management frame is an Action frame or an Action No ACK frame.

In an embodiment, the frame is a beacon frame transmitted by the second device.

In an embodiment, the frame is a Power Save (PS)-Poll frame or a Quality of Service (QoS) Null frame.

In an embodiment, the bandwidth is a widest allowed bandwidth, the widest allowed bandwidth being a maximum bandwidth that can be received by the second device, transmitted by the first device, and sensed by the first and second devices during active channel sensing.

In an embodiment, the frame is an ACK frame or a Block ACK (BA) frame.

In an embodiment, the frame is transmitted in response to an indication included in a preceding unicast frame transmitted by the second device.

BRIEF DESCRIPTION OF THE DRAWINGS

FIG. 6A illustrates a process for communicating using an OFDMA frame according to an embodiment.

FIG. 6B illustrates a process for communicating using an OFDMA frame according to an embodiment.

FIG. 13 illustrates a format of a frame for requesting OFDMA sub-band channels state information (CSI) according to an embodiment.

FIG. 14 illustrates a format of a Media Access Control (MAC) frame including High Efficiency (HE) fields according to an embodiment.

FIG. 23 illustrates a process of determining OFDMA sub-band CSI in an AP according to an embodiment.

DETAILED DESCRIPTION

Figure 1:
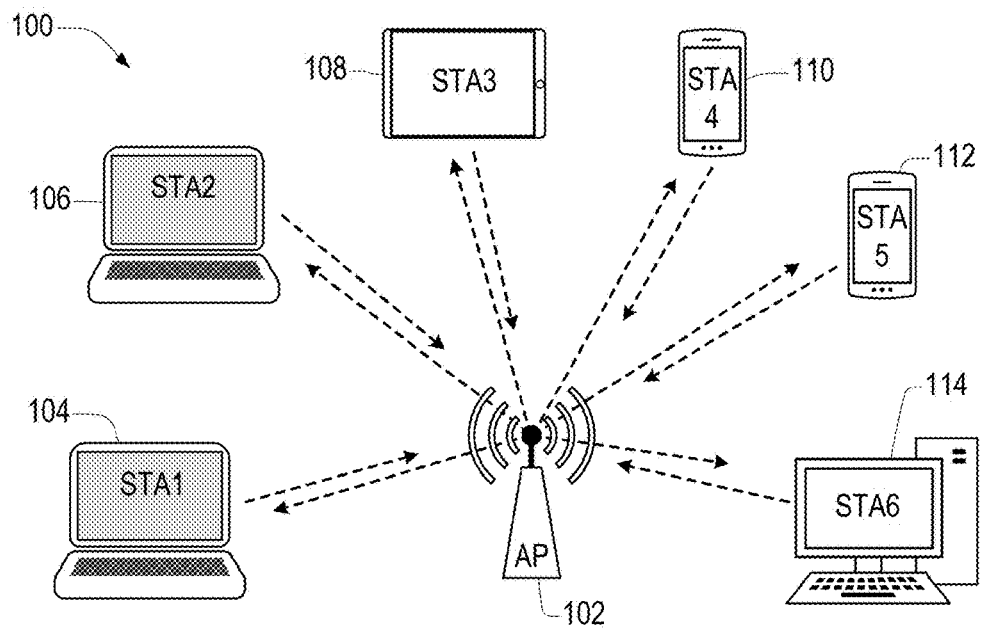
FIG. 1 illustrates a wireless network according to an embodiment.

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements throughout the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 wirelessly communicating with a plurality of wireless devices (or stations) 104 to 114 (also referred to as AP and STA1 to STA6). The wireless devices may include a medium access control layer (MAC) and a physical layer (PHY) according to an IEEE (Institute of Electrical and Electronics Engineers) 802.11 standard.

The AP 102 is a station, that is, a STA, configured to control and coordinate functions of the BSS 100. The AP 102 may transmit information to a single station selected from the plurality of stations STA1 to STA6 in the BSS 100 using a single frame, or may simultaneously transmit information to two or more (e.g., to all six) stations STA1 to STA6 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA6 may transmit data to the AP 102 using a single frame, or transmit information to and receive information from another one of the stations STA1 to STA6 using a single frame.

In another embodiment, the AP 102 may be absent and the stations STA1 to STA6 may be in an ad-hoc network.

Each of the stations STA1 to STA6 and the AP 102 includes a processor and a transceiver, and may further include a user interface and a display device. The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions. The processor and the transceiver may be implemented by hardware components and/or software components integrated within the respective STA1 to STA6 and/or the AP 102.

AP 102 may be or may include a WLAN router, a stand-alone Access Point, a WLAN bridge, a Light-Weight Access Point (LWAP) managed by a WLAN controller, and the like. In addition, a station such as a personal computer or cellular phone may be able to operate as the AP 102, such as when a cellular phone is configured to operate as a wireless "hot spot."

Each of STA1 to STA6 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to higher layer of a communication protocol stack. A control frame may be a frame used for controlling access to a medium. A data frame may be a frame used for transmitting data to be forwarded to a higher layer of the communication protocol stack.

Each frame's type and subtype may be identified using a type field and a subtype field included in a control field of the frame, as prescribed in the applicable standard.

Figure 2:
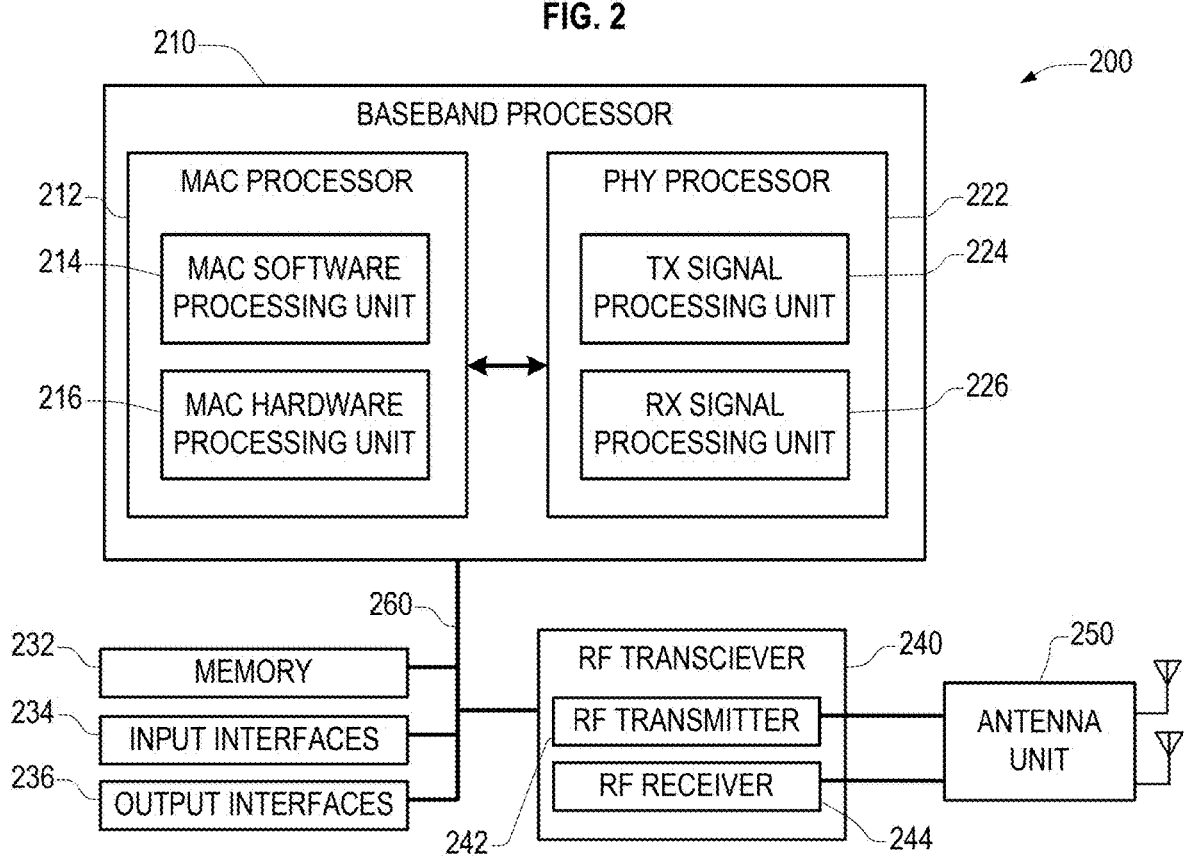
FIG. 2 illustrates a schematic block diagram of a wireless device according to an embodiment.

FIG. 2 illustrates a schematic block diagram of a wireless device 200 according to an embodiment. The wireless or WLAN device 200 can represent any device in a BSS, e.g., AP 102 or any of stations 104-114 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable medium that stores software (e.g., computer programing instructions) hereinafter referred to as "MAC software". The MAC software processing unit 214 executes the MAC software to implement a first plurality of functions of the MAC layer. The MAC hardware processing unit 216 may implement a second plurality of functions of the MAC layer in special-purpose hardware, hereinafter referred to "MAC hardware."However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation. In an embodiment, the PHY processor 222 may be configured to generate channel state information (CSI) according to information received from the RF transceiver 240.

The channel state information (CSI) may include one or more of a Received Signal Strength Indication (RSSI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software, and which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
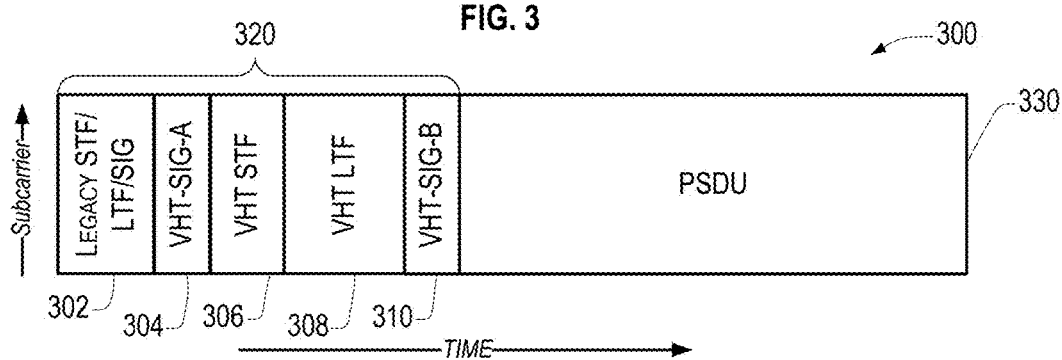
FIG. 3 illustrates an Orthogonal Frequency Division Multiplexing (OFDM) frame that may be employed in an embodiment.

FIG. 3 illustrates an Orthogonal Frequency Division Multiplexing (OFDM) frame 300 according to an embodiment. The OFDM frame 300 includes a PHY header 320 and a Physical Layer Convergence Procedure (PLCP) Service Data Unit (PSDU) 330. The PHY header 320 includes a legacy preamble 302, a Very High Throughput (VHT) first signal (VHT-SIG-A) field 304, a VHT Short Training Field (VHT-STF) 306, a VHT Long Training Field (VHT-LTF) 308, and a VHT second signal (VHT-SIG-B) field 310.

The legacy preamble 302 includes Legacy STF (L-STF) and Legacy LTF (L-LTF) fields that include symbols that are used by a receiving device to identify the start of the OFDM frame 300, synchronize timers, and, in MIMO-capable equipment, select an antenna. The legacy preamble 302 also includes a Legacy Signal (L-SIG) field that includes information from which a legacy receiving device (for example, a device operating according to IEEE Std 802.11ac™) may determine a data rate and a length for the frame.

The VHT-SIG-A field 304 and VHT-SIG-B field 310 include information that the receiver uses to receive the PSDU 312, such as a bandwidth indication, a Space-Time Block Coding (STBC) indication, a Group ID, a partial Association Identifier (AID) field, a Modulation and Coding Scheme (MCS) indication, and so on.

The VHT-STF 306 and VHT-LTF 308 fields include symbols that are used by the receiving device to set receiver gain and to estimate a channel between a transmitter of the OFDM frame 300 and the receiving device, respectively.

The PSDU 330 includes data symbols that are used to transport an aggregate MAC Protocol Data Unit (A-MPDU) including one or more MPDUs. The MPDUs in the PSDU 330 are intended either for a single receiving device when the OFDM frame 300 is not a broadcast frame, or for all the receiving devices in a group when the OFDM frame 300 is a broadcast frame wherein all the receiving devices in the group receive the same information.

As can be seen in FIG. 3, the PSDU 330 uses all of the subcarriers used by the PHY header 320. Therefore, in an embodiment, a frame using a 20 MHZ frequency segment includes the PSDU 330 using 56 subcarriers, a frame using a 40 MHZ frequency segment includes the PSDU 330 using 114 subcarriers, a frame using a 80 MHZ frequency segment includes the PSDU 330 using 242 subcarriers, and a frame using a 160 MHZ frequency segment or two 80 MHz frequency segments includes the PSDU 330 using 484 subcarriers.

Figure 4:
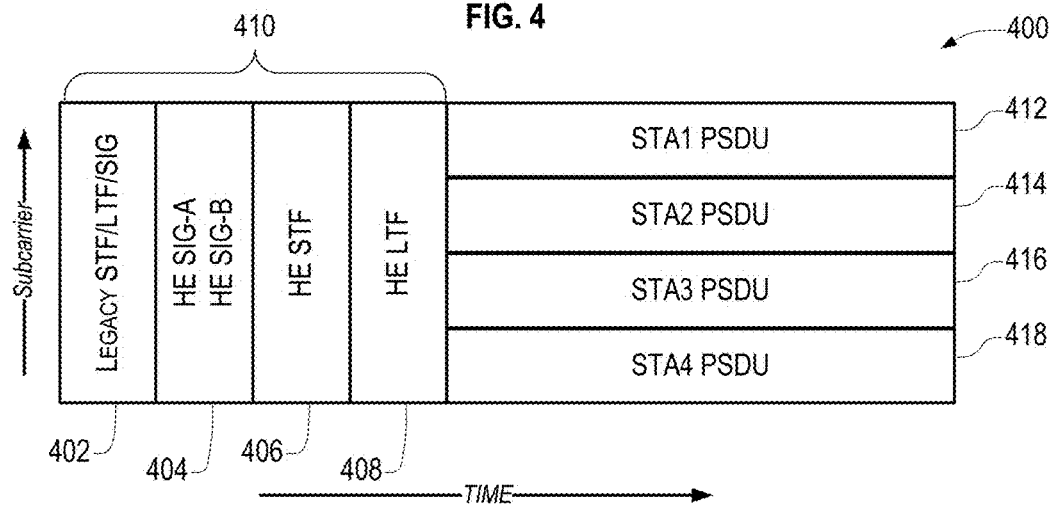
FIG. 4 illustrates an Orthogonal Frequency Division Multiple Access (OFDMA) frame that may be employed in an embodiment.

FIG. 4 illustrates an Orthogonal Frequency Division Multiple Access (OFDMA) frame 400 such as may be transmitted in an embodiment. The OFDMA frame 400 includes a PHY header 410 and first, second, third, and fourth PSDUs 412, 414, 416, and 418.

The PHY header 410 includes a legacy preamble 402, a High Efficiency (HE) signal portion 404, an HE Short Training Field (HE STF) 406, and an HE Long Training Field (HE LTF) 408. Unlike the PHY header 320, the PHY header 410 includes an indication that the OFDMA frame 410 is an OFDMA frame, or in some embodiments, there would be an indication whether the frame is a single-user (SU) or a multi-user (MU) frame.

The High Efficiency (HE) signal portion 404 includes an HE signal A (HE SIG-A) field, which is transmitted using one or more symbols, and an HE signal B (HE SIG-B) field, which is transmitted using one or more symbols. The HE SIG-A field and HE SIG-B field include information that the receiver uses to receive the first, second, third and fourth PSDUs 412, 414, 416, and 418. In an embodiment, a single HE SIG-A field may be duplicated across a plurality of frequency blocks and may contain information common to all of the first, second, third and fourth PSDUs 412, 414, 416, and 418. In an embodiment, the HE SIG-B field includes a unique sub-field for each of the first, second, third and fourth PSDUs 412, 414, 416, and 418. In an embodiment, the HE SIG-B field may have a variable length.

The HE STF 406 and HE LTF 408 fields include symbols that are used by the receiving device to set receiver gain and to estimate a channel between a transmitter of the OFDMA frame 400 and the receiving device, respectively.

The first, second, third and fourth PSDUs 412, 414, 416, and 418 occupy respective sub-bands within the frequency segment used by the OFDMA frame 400, each sub-band including a contiguous plurality of subcarriers. Each of the first, second, third and fourth PSDUs 412, 414, 416, and 418 includes data symbols that are used to transport A-MPDUs including one or more MPDUs.

The MPDUs in each of the first, second, third and fourth PSDUs 412, 414, 416, and 418 may each be intended for a different receiving device, respectively. FIG. 4 illustrates the first, second and fourth PSDUs 412, 414, 416, and 418 associated with first through fourth stations STA1 through STA4, respectively. However, embodiments are not limited thereto.

In an embodiment, of the OFDMA frame 400 using a 20 MHZ frequency segment may include 9 PSDUs, the OFDMA frame 400 using a 40 MHZ frequency segment may include 18 PSDUs, the OFDMA frame 400 using a 80 MHZ frequency segment may include 36PSDUs, and the OFDMA frame 400 using a 160 MHZ frequency segment or two 80 MHZ frequency segments may include 72 PSDUs.

Figure 5:
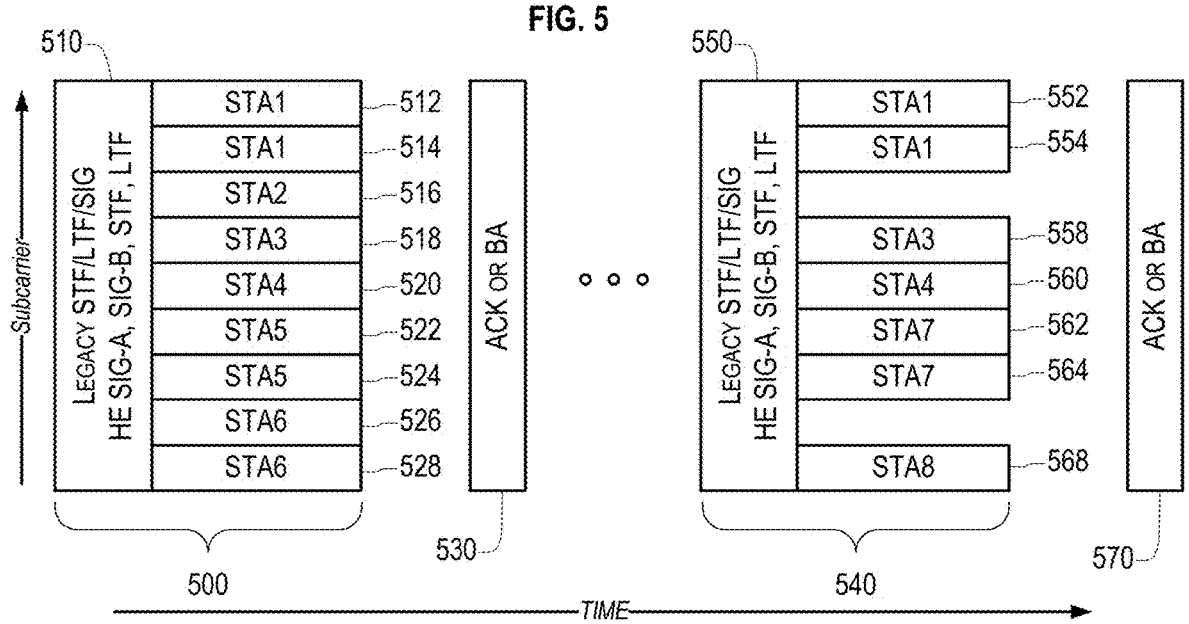
FIG. 5 illustrates a sequence of frames including a plurality of OFDMA frames according to an embodiment.

FIG. 5 illustrates a sequence of frames according to an embodiment, illustrating an association of PSDUs with receiving devices (e.g., the stations STA1 to STA6 of FIG. 1). The sequence of frames includes a first OFDMA frame 500, a first acknowledgement (ACK) frame 530, a second OFDMA frame 540, and a second ACK frame 570. In an embodiment, each of the frames uses a 20 MHZ frequency segment, and the first and second OFDMA frames 500 and 540 each include nine sub-bands within the 20 MHz frequency segment (where considering the guard-bands in each side, each sub-channel would be 2 MHz.)

The first OFDMA frame 500 includes a PHY header 510 substantially similar to the PHY header 410 of FIG. 4. The first OFDMA frame 500 further includes first through ninth sub-bands 512 through 528, each including a contiguous plurality of subcarriers.

In the first OFDMA frame 500, the first and second sub-bands 512 and 514 are used to transport information to a first station STA1. The third, fourth, and fifth sub-bands 516, 518, and 520 are used to transport data to second, third, and fourth stations STA2, STA3, and STA4, respectively. The sixth and seventh sub-bands 522 and 524 are used to transport information to a fifth station STA5. The eighth and ninth sub-bands 526 and 528 are used to transport information to a sixth station STA6.

The first OFDMA frame 500 is followed by one or more first ACK or Block ACK (BA) frames 530.

In the example of FIG. 5, at some time after the first OFDMA frame 500 is transmitted, the second OFDMA frame 540 is transmitted. Like the first OFDMA frame 500, the second OFDMA frame 540 includes a PHY header 550 substantially similar to the PHY header 410 of FIG. 4 and first through ninth sub-bands 522 through 568, each including a contiguous plurality of subcarriers. The second OFDMA frame 540 may use the same 20 MHz frequency segment that was used by the first OFDMA frame 500.

The allocation of sub-bands to stations in the second OFDMA frame 540 could be different from the allocation of sub-bands to stations in the first OFDMA frame 500. In the second OFDMA frame 540, the first and second sub-bands 552 and 554 are again used to transport information to a first station STA1, and the fourth and fifth sub-bands 558 and 560 are again used to transport data to third and fourth stations STA3 and STA4, respectively.

However, unlike in the first OFDMA frame 500, in the second OFDMA frame 540, the sixth and seventh sub-bands 562 and 564 are used to transport information to a seventh station STAT, the ninth sub-band 568 is used to transport information to an eighth station STA8, and the third and eight sub-bands are not used.

The second OFDMA frame 540 is followed by one or more second ACK or BA frames 570.

FIGS. 6A and 6B illustrates a process 600 for communicating using an OFDMA frame according to an embodiment. In the illustrated example, a BSS (e.g. the BSS 100 of FIG. 1) includes an AP and first, second, and third OFDMA-capable stations STA1, STA2, and STA3.

At S610, for each of the stations STA1, STA2, and STA3, the AP determines sub-band channel state information (CSI) for a plurality of sub-bands of a bandwidth available for OFDMA communication between the AP and the stations STA1, STA2, and STA3. In an embodiment, the bandwidth is a widest available bandwidth that can be transmitted across its entirety by the AP, received across its entirety by the stations in the BSS, and sensed across its entirety by channel sensing methods, for example, using Clear Channel Assessment (CCA).

In an embodiment, determining the sub-band CSI at S610 includes a sounding process such as the sounding process 612 shown in FIG. 6B. However, embodiments are not limited thereto.

In the sounding process 612, at S614 the AP transmits a sounding frame OFDM_DF to be used for OFDMA sub-band sounding to the stations STA1, STA2, and STA3, e.g., to all the stations associated within the BSS. The frame OFDM_DF is an OFDM downlink frame in an implementation. The frame OFDM_DF may be transmitted at the widest allowable bandwidth.

In an embodiment, the frame OFDM_DF includes an indication that OFDMA sub-band sounding is to be performed using the frame OFDM_DF. In another embodiment, the indication that OFDMA sub-band sounding is to be performed using the frame OFDM_DF is based on previously provided instruction, e.g., as part of a previous frame transmitted by the AP or as part of communication protocol policy when the stations were first associated with the AP to form a particular BSS. In another embodiment, whether to perform OFDMA sub-band sounding using the frame OFDM_DF is determined according to a preconfigured internal policy of a station receiving the frame OFDM_DF.

In some embodiments, the OFDM_DF frame could be any of the frames that the AP sends as part of its regular functions, such as a broadcast frames (e.g., Beacon frames), a normal data carrying frame (to a set of STAs) or a control frame (that possibly polls a set of STAs to send UL frames such as a Trigger frame), and all or a subset of the STAs that are addressed by the OFDM_DF frame performs the required processing for determining CSI on that frame. In some embodiments, the OFDM_DF frame may be an NDP frame or may be a pre-announced frame preceded by an announcement frame (for example, an NDP frame preceded by a NDP Announcement (NDPA) frame.)

In an embodiment, all stations receiving frame OFDM_DF perform OFDMA sub-band sounding using the frame OFDM_DF. In another embodiment, the frame OFDM_DF includes an indication of which stations are to perform OFDMA sub-band sounding. The indication may include one or more addresses or identifiers respectively corresponding to stations in the BSS (such as, for example, all or a portion of one or more Association IDs (AIDs)), an identifier of a previously established group of stations in the BSS, or an indication corresponding to all of the stations in the BSS. The group identification would be based on a prior announced group-membership that associated a set of STAs with a single identifier.

In an embodiment, the frame OFDM_DF may further include parameters for use in determining and reporting the OFDMA sub-band CSI. The parameters may include one or more of a bandwidth resolution and an indication of one or more sub-bands to be reported on or not reported on. Some or all of these parameters in general might be specific to each STA, and some could be generally specified for all the STAs.

In another embodiment, the indication of which stations are to perform OFDMA sub-band sounding, the parameters for use in determining and reporting the OFDMA sub-band CSI, or both may be included in a previous frame broadcast by the AP that indicated that the OFDMA sub-band sounding was to be performed (e.g., an NDPA frame).

The stations STA1, STA2, and STA3 each determines respective OFDMA sub-band CSI using the frame OFDM_DF, e.g., to process and obtain RSSI, SINR, MCS, and NSS per sub-band or set of sub-bands for each of AP's transmitting antennas with respect to each station's receiving antennas. In an embodiment, the stations STA1, STA2, and STA3 determine the OFDMA sub-band CSI using the LTF symbols (e.g., VHT LTF or HE-LTF symbols) of the frame OFDM_DF.

At S616, the first station STA1 transmits a first OFDMA sub-band CSI report frame CSI1 to the AP. The first OFDMA sub-band CSI report frame CSI1 is a report transmitted in response to the OFDM_DF frame of S614, and includes OFDMA sub-band CSI determined by the first station STA1 according to the frame OFDM_DF of S614. In an embodiment, each station sends their respective CSI report frame unsolicited, e.g., according to carrier sense multiple access with collision avoidance (CSMA/CA) protocol. Alternatively, each station may send the respective CSI report frame whenever the AP sends a request. In some embodiments, the sub-band CSI report may be included as additional fields and sub-fields in a data frame that a STA sends to the AP. In some embodiments, the sub-band CSI report may be included in a management frame sent to the AP.

In an embodiment, the OFDMA sub-band CSI report frame may be a MAC frame including the OFDMA sub-band CSI in a High Efficiency Control Extension (HECE) field of a High Throughput Control (HT Control) field. In an embodiment, the OFDMA sub-band CSI report frame may be an Action or Action No ACK frame including an Action field indicating that the frame is an OFDMA sub-band CSI report frame.

At S618, the second station STA2 transmits a second OFDMA sub-band CSI report frame CSI2 to the AP. The second OFDMA sub-band CSI report frame CSI2 includes OFDMA sub-band CSI determined by the second station STA2 according to the frame OFDM_DF of S614. The second station STA2 may send the CSI report frame either unsolicited or whenever the AP sends a request.

At S620, the third station STA3 transmits a third OFDMA sub-band CSI report frame CSI3 to the AP. The third OFDMA sub-band CSI report frame CSI3 includes OFDMA sub-band CSI determined by the third station STA3 according to the frame OFDM_DF of S614. The third station STA3 may send the CSI report frame either unsolicited or whenever the AP sends a request.

Returning to FIG. 6A, at S630 the AP determines an allocation of sub-bands to stations in the BSS according to the information included in the first, second, and third OFDMA sub-band CSI report frames CSI1, CSI2, and CSI3.

In an embodiment, allocating sub-bands to stations includes determining a number of sub-bands to allocate to each station, and assigning sub-bands to each station until the allocated number of sub-bands in the channel is assigned to each station. Each sub-band may be assigned to a station, from among the stations having less than the allocated number of sub-bands currently assigned to them, for which the sub-band has the most suitable CSI, e.g., a highest channel magnitude or among the sub-bands with highest channel magnitude.

In some embodiments, the AP may be configured to use other processes for allocating sub-bands to stations according to the sub-band CSI for each station, such as water filling, call admission control, and the like.

At S650, the AP prepares an OFDMA frame OFDMA_F including first, second, and third information intended for delivery to the first, second, and third stations STA1, STA2, and STA3, respectively. The first to third information may include data from buffers within the AP, each buffer being respectively associated with an intended station of the first to third stations STA1 to STA3. The first information is disposed in one or more sub-bands assigned to the first station STA1, the second information is disposed in one or more sub-bands assigned to the second station STA2, and so on.

At S670, the AP transmits the OFDMA frame OFDMA_F to the stations STA1, STA2, and STA3 according to the sub-band allocation performed in S650.

Figure 7:
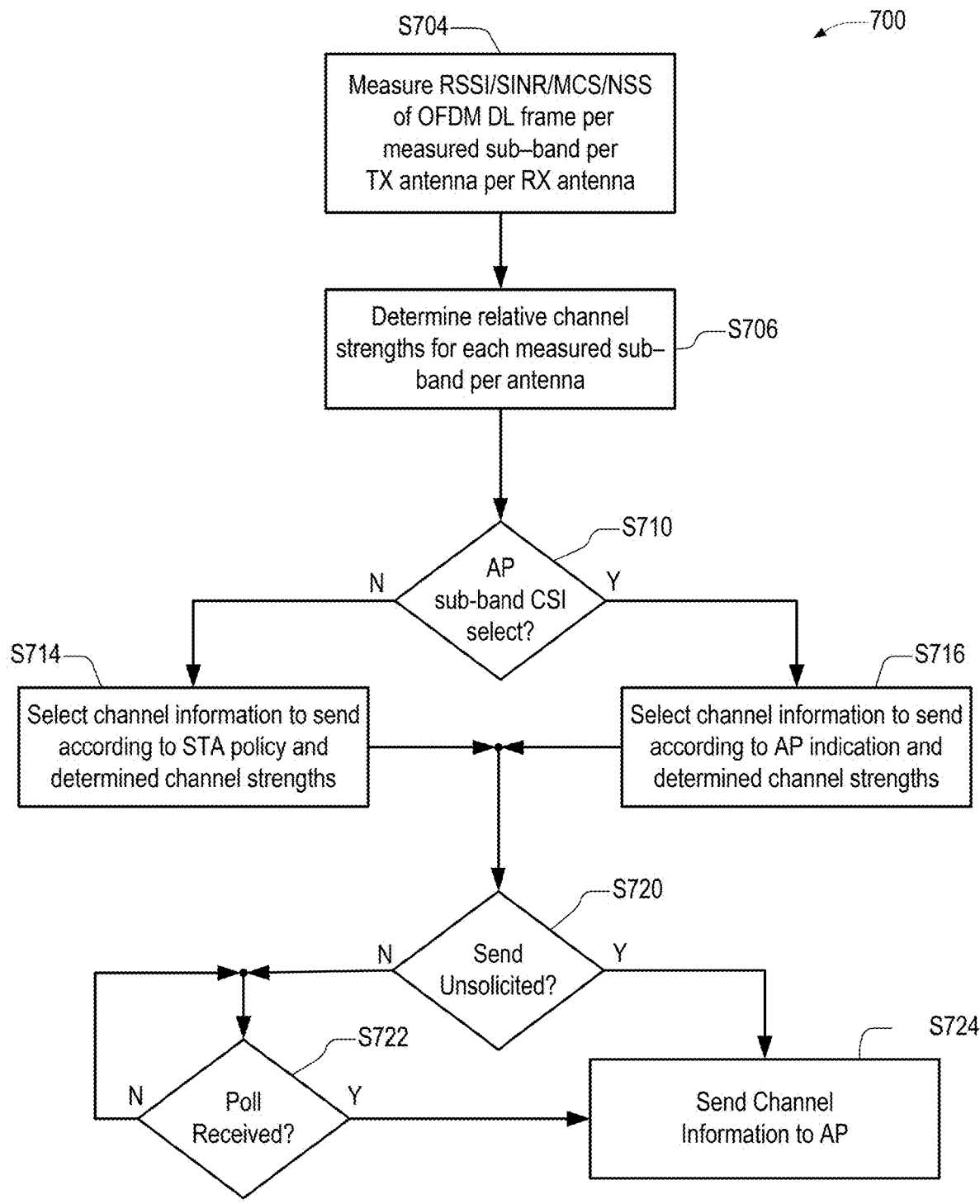
FIG. 7 illustrates a process of determining OFDMA sub-band CSI in a station according to an embodiment.

FIG. 7 illustrates a process 700 of determining OFDMA sub-band CSI in a station (e.g., STA1, STA2, or STA3) according to an embodiment.

At S704, the station measures one or more characteristics of a channel between a transmitter of a downlink (DL) frame, such as an AP, and the station. The station measures the channel characteristics using one or more fields of the DL frame, such as, for example, a Very High Throughput Long Training Field (VHT-LTF) or HE-LTF symbols.

In an embodiment, the DL frame is an OFDM downlink frame (e.g., OFDM_DF illustrated in FIG. 6B) transmitted using a frequency segment having a widest allowable bandwidth. The widest allowable bandwidth is a widest bandwidth that can be transmitted in its entirety by the transmitter, received across its entirety by the stations in the BSS, and sensed in its entirety by active channel sensing. The widest allowable bandwidth is sometimes constrained by the assessment of the channel at the transmitter side.

In an embodiment, the DL frame may be a Null Data Packet (NDP). In an embodiment, the DL frame may be a MAC Control frame, a MAC Data frame, or a MAC Management frame.

In an embodiment, the station may measure only some of the sub-bands within the frequency segment. The sub-bands to be measured may be determined using an indication included in a frame received from the AP, such as a received Null Data Packet Announce (NDPA), Action, or Action No ACK frame that include an indication that OFDMA sub-band CSI was to be determined, or the DL frame.

In an embodiment, the received indication of which sub-bands to measure may include an indication determined according to a prior allocation of one or more sub-bands to one or more other stations. In an embodiment, the received indication of which sub-bands to measure may be determined according to prior OFDMA sub-band CSI provided by the station.

In another embodiment, the sub-bands to be measured may be determined according to a policy of the station and previously determined information. The previously determined information may include values of previously determined OFDMA sub-band CSI, which OFDMA sub-band CSI was previously reported to the AP, and previously received indications from the AP.

The measurements taken for each sub-band may include a Received Signal Strength Indication (RSSI), a Signal to Interference and Noise Ratio (SINR), a Modulation and Coding Scheme (MCS), a Number of Spatial Streams (NSS), and the like. In an embodiment, measurements for each of a plurality of subcarriers of each sub-band are combined to determine a respective measurement for each sub-band.

The measurements for each sub-band may be taken for each of a plurality of transmitting antennas when the DL frame is transmitted using the plurality of transmitting antennas. The measurements for each sub-band may be taken for each of a plurality of receiving antennas when the DL frame is received using the plurality of receiving antennas. The measurements for each sub-band may be taken for each combination of a transmitting antenna and a receiving antenna when the DL frame is transmitted using the plurality of transmitting antennas and received using the plurality of receiving antennas.

At S706, the station determines channel strength measures for each measured sub-band. In an embodiment, the channel strength measures for each measured sub-band are determined for each transmitting antenna, for each receiving antenna, and/or for each combination of a transmitting antenna and a receiving antenna.

Determining the channel strength measures for each measured sub-band may include computing a metric using one or more of an RSSI, an SINR, an MCS, and an NSS. The metric may be normalized to indicate relative channel information between the measured sub-bands.

In an embodiment, computing an RSSI, an SINR, or both of a sub-band may include computing an average of RSSIs or SINRs, respectively, of the subcarriers that belong to the sub-band. In an embodiment, computing an MCS of a sub-band may include computing a highest bit rate MCS that meets a Packet Error Rate (PER) requirement. In an embodiment, computing an NSS of a sub-band may include computing a highest NSS that meets the PER requirement.

At S710, the station determines how to select which OFDMA sub-band CSI to report. Selecting the OFDMA sub-band CSI to be reported may include one or more of combining and omitting information associated with the measured sub-bands. For example, the STA may report the measured values for sub-bands that meet a criterion (such as a channel strength, RSSI or SINR being larger than a threshold or an MCS having a larger index value or data rate than a given reference MCS) and omit reporting the measured values for the sub-bands that do not meet the criterion.

Because sub-bands that are not selected for reporting did not satisfy the criteria, an AP receiving the selected CSI may determine that the one or more sub-bands for which CSI was not reported are unsuitable or disfavored for use in communicating with the station providing the report. Accordingly, selective reporting of the CSI produces feedback that is more concise than feedback that reports all the CSI while still reporting the most useful feedback, that is, the feedback on sub-bands that are suitable for consideration during selection of sub-bands for communicating with the station.

When an indication of which OFDMA sub-band CSI to report has been received from the AP, at S716 the station determines the OFDMA sub-band CSI to report using indications from the AP and the determined channels strengths. In an embodiment, the station may determine the OFDMA sub-band CSI to be reported according to parameters, a policy, or both received in a NDPA, Action, or Action No ACK frame.

When the AP has not indicated the OFDMA sub-band CSI to be reported, at S714 the station determines the OFDMA sub-band CSI to report according to a station policy and the determined channels strengths.

Determining the OFDMA sub-band CSI to be reported may include combining measurements. The measurements to be combined or averaged may be measurements from adjacent sub-bands, measurements associated with different antennas, or both.

In an embodiment, measurements for a plurality of adjacent sub-bands are combined into a single measurement when a measurement bandwidth resolution is greater than or equal to the combined bandwidths of the plurality of adjacent sub-bands. In an embodiment, the station may determine to combine measurements for a plurality of adjacent sub-bands when a difference or a ratio between one or more respective measurements of the adjacent sub-bands is less than one or more respective predetermined thresholds.

In an embodiment, measurements for a plurality of transmitting antennas, receiving antennas, or combinations of receiving and transmitting antennas may be combined into a single measurement. In an embodiment, the station may determine to combine measurements for a plurality of antennas when a difference or a ratio between one or more respective measurements of the antennas is less than one or more respective predetermined thresholds.

Determining the OFDMA sub-band CSI to be reported may include determining which sub-bands to report on. In an embodiment, the sub-bands to be reported may be determined according to an indication of which sub-bands to report on included in the NDPA frame sent by the AP. The NDPA frame may include on or more identifiers to identify the STAs to report, such as one or more of an identification associated with a station, a group identification, and a broadcast identification.

In an embodiment, the sub-bands to be reported may be determined by the station according to a reporting policy of the station. The reporting policy may control which sub-band CSI is reported according to prior CSI reported for each sub-band, according to a suitability evaluation for each sub-band, or both.

In an embodiment, the station may only report a sub-band when the current CSI of the sub-band is substantially different from previously reported CSI for the sub-band.

In an embodiment, the current CSI of the sub-band may be substantially different from the previously reported CSI for the sub-band when, for example, one or more of a current RSSI, SINR, MCS, NSS, and relative channel strength differ from a respective one or more previously reported RSSI, SINR, MCS, NSS, and channel strength measure by a respective predetermined value.

In an embodiment, the current CSI of the sub-band may be substantially different from the previously reported CSI for the sub-band when, for example, a ratio of one or more of a current RSSI, SINR, MCS, NSS, and channel strength measure to a respective one or more previously reported RSSI, SINR, MCS, NSS, and channel strength measure is greater than or less than a respective predetermined value.

In an embodiment, the sub-bands to be reported may be determined by the station according to the suitability of each sub-band for transmitting frames to the station. In an embodiment, the CSI of a sub-band is reported only when one or more of the RSSI, SINR, MCS, NSS, and channel strength measure meets a respective criteria. For example, a CSI of a sub-band may only be reported when the SINR exceeds a predetermined value, the MCS is one of a plurality of preferred modulation and coding schemes, the relative signal strength is within a predetermined top percentile of the relative signal strengths of the measured sub-bands, or a combination of these criteria.

At S720, the station determines whether the OFDMA sub-band CSI is to be sent unsolicited, i.e., without a targeted instruction from the AP to the station. In an embodiment, the OFDMA sub-band CSI is sent unsolicited when the downlink frame used to perform the channel measurements is an NDP frame and the station is the first or only station indicated as performing channel measurements using the downlink frame.

When the OFDMA sub-band CSI is not to be sent unsolicited, at S722 the station waits for a poll frame to be received. The poll frame may poll several stations among which are the station. For example, the poll frame may be a Trigger frame that polls several STAs to send frames in UL OFDMA or UL MU-MIMO formats.

When the OFDMA sub-band CSI is to be sent unsolicited or after a poll frame is received, at S724 the station transmits the OFDMA sub-band CSI. In an embodiment, the station transmits the OFDMA in a management frame of type Action or Action No ACK, the management frame having an Action field with a value indicating that OFDMA sub-band CSI is being reported.

In an embodiment, the station transmits the OFDMA sub-band CSI to be reported in an uplink frame having an HT Control field including a High Efficiency Control Extension field including the reported OFDMA sub-band CSI and an indication that OFDMA sub-band CSI is being reported.

Figure 8:
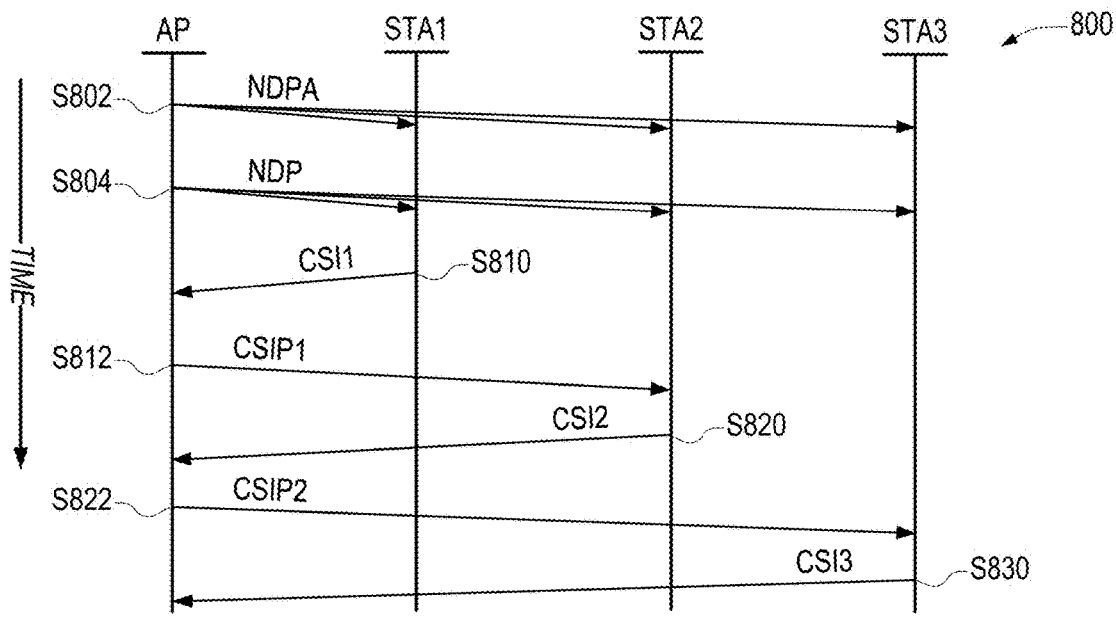
FIG. 8 illustrates an Access Point (AP) initiated channel sounding process according to another embodiment.

FIG. 8 illustrates an AP initiated sub-band sounding process 800 for OFDMA downlink operations according to another embodiment. In the illustrated example, a BSS includes an AP and first, second, and third OFDMA-capable stations STA1, STA2, and STA3.

At S802, the AP transmits a Null Data Packet Announcement (NDPA) frame to the stations STA1, STA2, and STA3, e.g., to all the stations associated with the BSS. The NDPA frame is transmitted at a widest allowable bandwidth, wherein the widest allowable bandwidth is the widest bandwidth that can be transmitted across its entirety by the AP, received across its entirety by the stations in the BSS, and sensed across its entirety by active channel sensing (e.g., Clear Channel Assessment (CCA)).

The NDPA frame includes an indication that this process is for an OFDMA procedure, an indication that the NDPA frame is applicable to a set of OFDMA-capable stations, and an indication that the NDPA frame is applicable to all stations associated with the BSS. The NDPA frame includes an indication that a subsequent frame transmitted by the AP, for example, a Null Data Packet (NDP) frame, is to be used as a sounding frame by one or more of the stations STA1, STA2, and STA3 to determine OFDMA sub-band channel state information (CSI). The NDPA frame may also include an indication of whether each station is to provide solicited or unsolicited reporting of the OFDMA sub-band CSI.

To designate which stations are to determine the OFDMA sub-band CSI, the NDPA frame may include one or more addresses or identifiers respectively corresponding to stations in the BSS, an identifier of a previously established group of stations in the BSS, or an indication corresponding to all of the stations in the BSS.

In an embodiment, the NDPA frame may further include parameters for use in determining and reporting the OFDMA sub-band CSI. The parameters may include one or more of a bandwidth resolution and an indication of one or more sub-bands to be reported on or not reported on.

At S804, the AP transmits the sounding frame to be used for OFDMA sub-band sounding, which is an NDP frame in an implementation. The NDP frame is transmitted at the same widest allowable bandwidth as the NDPA frame was at S802. The stations STA1, STA2, and STA3 each determines respective OFDMA sub-band CSI using the NDP frame, e.g., RSSI, SINR, MCS, and NSS per sub-band for each of AP's transmitting antennas with respect to each of station's receiving antennas. In an embodiment, the stations STA1, STA2, and STA3 determine the OFDMA sub-band CSI using LTF symbols such as VHT-LTF or HE-LTF symbols of the NDP frame.

At S810, the first station STA1 transmits a first OFDMA sub-band CSI report frame CSI1 to the AP. The first OFDMA sub-band CSI report frame CSI1 is a report transmitted in response to the NDP frame of S804, and includes OFDMA sub-band CSI determined by the first station STA1 according to the NDPA frame of S802 and the NDP frame of S804. In an embodiment, each station sends their respective CSI report frame either unsolicited or whenever the AP sends a request.

In an embodiment, the OFDMA sub-band CSI report frame CSI1 may be a MAC frame including the OFDMA sub-band CSI in a High Efficiency Control Extension (HECE) field of a High Throughput Control (HT Control) field. In an embodiment, the OFDMA sub-band CSI report frame CSI1 may be an Action or Action No ACK management frame, each of which would include an Action field indicating that the frame is an OFDMA sub-band CSI report frame.

In an embodiment, the first station STA1 transmits the OFDMA sub-band CSI report frame CSI1 unsolicited, that is, without receiving a trigger or request frame, and subsequent stations STA2 and STA3 transmit respective OFDMA sub-band CSI report frames CSI2 and CSI3 in response to receiving respective trigger or request frames.

At S812, the AP transmits a first OFDMA sub-band CSI poll frame CSIP1 to the second station STA2. The first OFDMA sub-band CSI poll frame CSIP1 may include indications such as the STA identifier, a reference to the identification of an earlier NDPA frame, and a set of identifiers to reference the sub-bands that CSI is sent to the AP. In an embodiment, the first OFDMA sub-band CSI poll frame CSIP1 may include an indication that the frame is an OFDMA sub-band CSI poll frame.

At S820, in response to the first OFDMA sub-band CSI poll frame CSIP1, the second station STA2 transmits a second OFDMA sub-band CSI report frame CSI2 to the AP. The second OFDMA sub-band CSI report frame CSI2 is a solicited report, and includes OFDMA sub-band CSI determined by the second station STA2 according to the NDPA frame of S802 and the NDP frame of S804.

At S822, the AP transmits a second OFDMA sub-band CSI poll frame CSIP2 to the third station STA3. The second OFDMA sub-band CSI poll frame CSIP2 may include indications such as the STA identifier, a reference to the identification of an earlier NDPA frame, and a set of identifiers to reference the sub-bands that CSI is sent to the AP. In an embodiment, the second OFDMA sub-band CSI poll frame CSIP2 may include an indication that the frame is an OFDMA sub-band CSI poll frame.

At S830, in response to the second OFDMA sub-band CSI poll frame CSIP2, the third station STA3 transmits a third OFDMA sub-band CSI report frame CSI3 to the AP. The third OFDMA sub-band CSI report frame CSI3 is a solicited report, and includes OFDMA sub-band CSI determined by the third station STA3 according to the NDPA frame of S802 and the NDP frame of S804.

The AP determines an allocation of sub-bands to stations in the BSS according to the information included in the first, second, and third OFDMA sub-band CSI report frames CSI1, CSI2, and CSI3.

Figure 9:
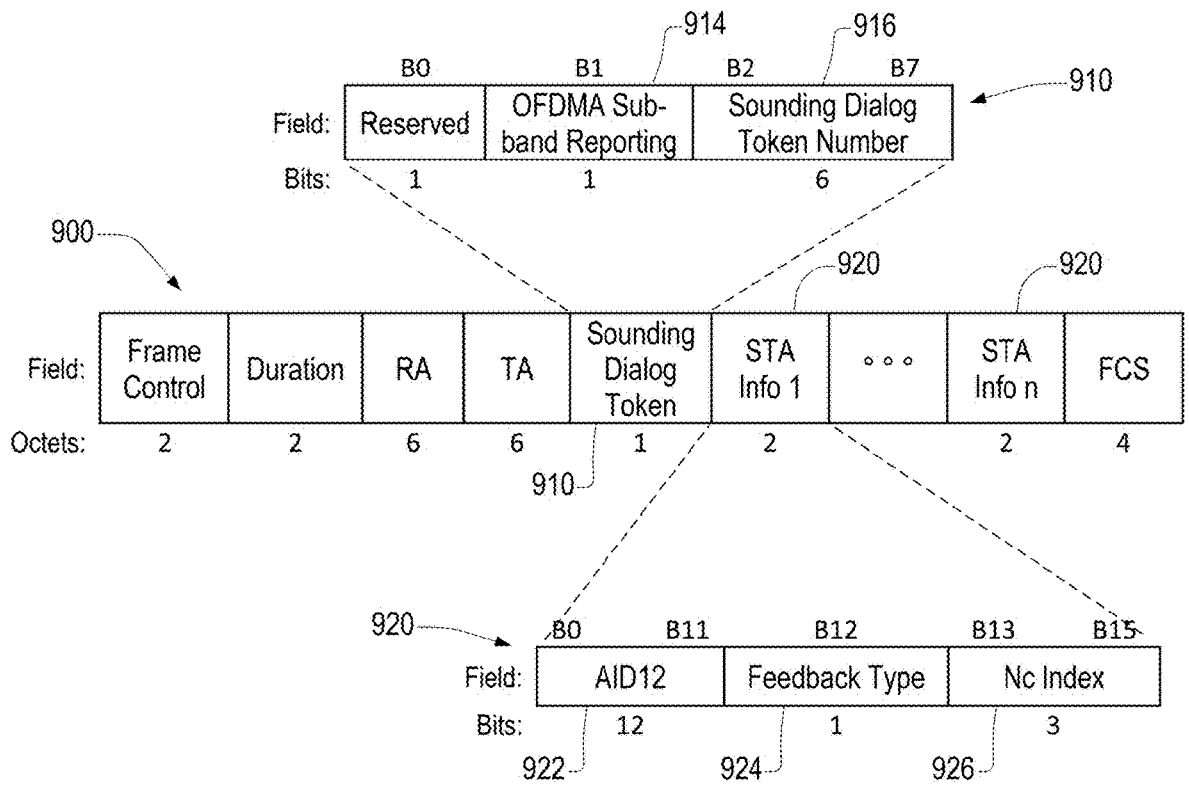
FIG. 9 illustrates a format of a Null Data Packet Announcement (NDPA) frame according to an embodiment.

FIG. 9 illustrates a Null Data Packet Announcement (NDPA) frame 900 according to an embodiment. The NDPA frame 900 is an OFDM MAC frame that is a modification of the Very High Throughput (VHT) NDPA frame described in § 8.3.1.20 of IEEE Std 802.11ac. In the interest of brevity, when a frame is a modification of an IEEE Std 802.11 frame, primarily differences between the variant frame and the standard frame will be described, but other differences between the two frame types may exist.

In the NDPA frame 900, a bit in the Sounding Dialog Token 910 that was a reserved bit in the VHT NDPA frame is used as an OFDMA Sub-band Reporting field 914. When the OFDMA Sub-band Reporting field 914 has a first value, for example, a value of 1, the NDPA frame 900 indicates that one or more stations are to perform OFDMA sub-band CSI determination instead of performing VHT CSI determination. When the OFDMA Sub-band Reporting field 914 has a second value, for example, a value of 0, the NDPA frame 900 does not indicate that OFDMA sub-band CSI determination is to be performed, and in an embodiment may instead indicate that VHT CSI determination is to be performed.

The Sounding Dialog Token 910 further includes a Sounding Dialog Token Number field 916 that identifies the NDPA frame 900 and may be used to associate a sounding request with corresponding responses.

The NDPA frame 900 may include one or more station (STA) info fields 920 that indicate which stations are to perform OFDMA sub-band CSI determination. The stations may be indicated by the Association Identifier subset (AID12) fields 922 of the STA info fields 920, which include the 12 least significant bits of the AID of a station expected to process the following NDP frame and prepare the sounding feedback. The STA info fields 920 may also supply parameters to be used by the corresponding stations in the OFDMA sub-band CSI determination, using one or more of the Feedback Type field 924 and the Nc Index field 926.

In an embodiment, when the NDPA frame 900 indicates that OFDMA sub-band CSI determination is to be performed, all stations indicated in the NDPA frame perform the OFDMA sub-band CSI determination.

Figure 10:
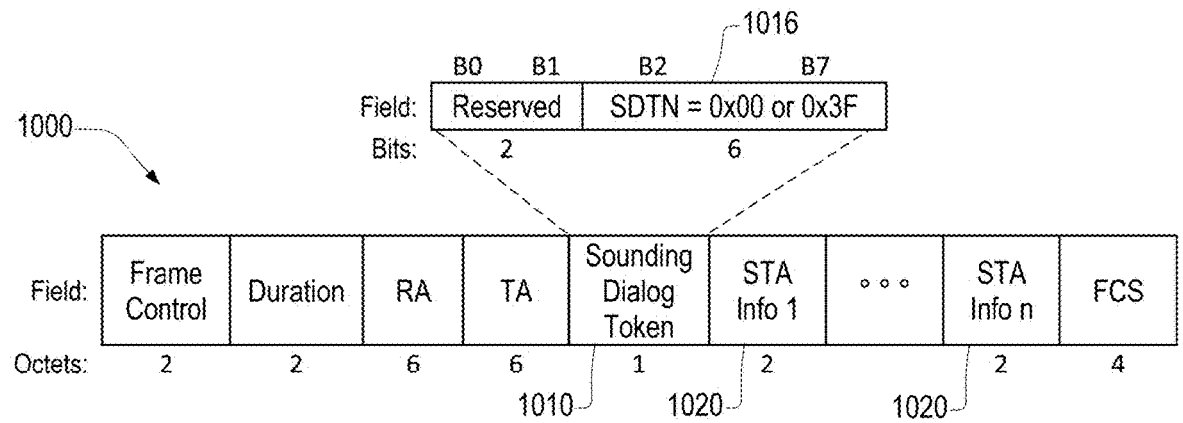
FIG. 10 illustrates a format of an NDPA frame according to another embodiment.

FIG. 10 illustrates an NDPA frame 1000 according to another embodiment. The NDPA frame 1000 is another modification of the VHT NDPA frame described in § 8.3.1.20 of IEEE Std 802.11ac.

In the NDPA frame 1000, a Sounding Dialog Token Number (SDTN) field 1016 of the Sounding Dialog Token field 1010 having a predetermined value, such as all 0's or all 1's, indicates that one or more stations are to perform OFDMA sub-band CSI determination instead of performing VHT CSI determination. When the SDTN field 1016 does not have the predetermined value, the NDPA frame 900 does not indicate that OFDMA sub-band CSI determination is to be performed, and may instead indicate that VHT CSI determination is to be performed according to an embodiment.

The NDPA frame 1000 may include one or more STA info fields 1020 that indicate which stations are to perform OFDMA sub-band CSI determination, and may communicate parameters to be used in performing the OFDMA sub-band CSI determination, as described above for the STA info fields 920 of FIG. 9.

Figure 11:
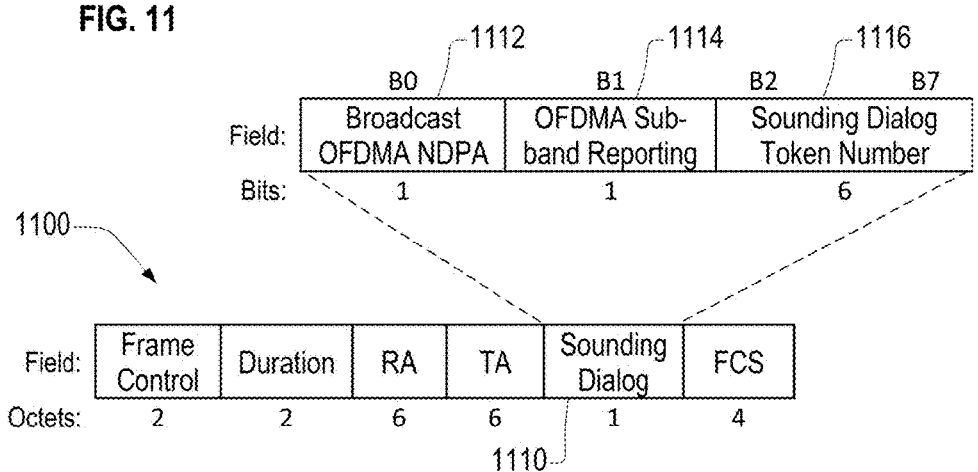
FIG. 11 illustrates a format of an NDPA frame according to another embodiment.

FIG. 11 illustrates NDPA frame 1100 according to another embodiment, wherein the NDPA frame 1100 may indicate that all stations in the BSS are to perform OFDMA sub-band CSI determination. The NDPA frame 1100 is a modification of the NDPA frame 900 of FIG. 9.

The NDPA frame 1100 uses bits in the Sounding Dialog field 1110 as an OFDMA Sub-band Reporting sub-field 1114 and a Broadcast OFDMA NDPA sub-field 1112. The OFDMA Sub-band Reporting field 1114 operates as described for the OFDMA Sub-band Reporting field 914 of FIG. 9. The Sounding Dialog field 1110 further includes a Sounding Dialog Token Number sub-field 1116 that operates as described for the Sounding Dialog Token Number field 916 of FIG. 9.

When the OFDMA Sub-band Reporting field 1114 indicates that OFDMA sub-band CSI determination is to be performed, the Broadcast OFDMA NDPA field 1112 having a first value, for example, a value of 1, indicates that all of the stations in the BSS are to perform the OFDMA sub-band CSI determination. In an embodiment, the NDPA frame 1100 may have no STA info fields when the Broadcast OFDMA NDPA field 1112 indicates that all of the associated stations in the BSS, or all of the associated stations in the BSS that are OFDMA-capable, are to perform the OFDMA sub-band CSI determination.

Figure 12:
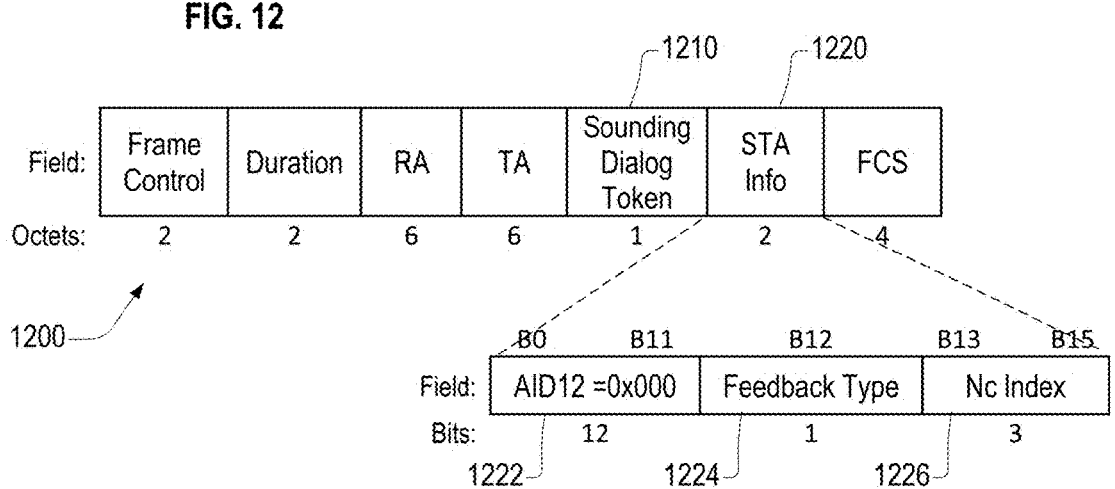
FIG. 12 illustrates a format of an NDPA frame according to another embodiment.

FIG. 12 illustrates an NDPA frame 1200 according to another embodiment, wherein the NDPA frame 1200 may indicate that all stations in the BSS are to perform OFDMA sub-band CSI determination. The NDPA frame 1200 is a modification of the NDPA frame 900 of FIG. 9.

When a Sounding Dialog Token 1210 of the NDPA frame 1200 indicates that OFDMA sub-band CSI determination is to be performed, an Association Identifier subset (AID12) field of a STA info field 1220 of the NDPA frame 1200 having a predetermined value, such as all zeros, indicates that all of the associated stations in the BSS, or all of the associated stations on the BSS that are OFDMA-capable are to perform the OFDMA sub-band CSI determination.

FIG. 13 illustrates an OFDMA CSI Request frame 1300 for requesting OFDMA sub-band channels state information (CSI) according to another embodiment. The OFDMA CSI Request frame 1300 is based on the format of the Beamforming (BF) Report Poll frame described in § 8.3.1.21 of IEEE Std 802.11ac™-2013. The OFDMA CSI Request frame 1300 differs from the BF Report Poll frame in having a different value in the Frame Control field 1304 and a Sounding Dialog field 1310 instead of a Feedback Segment Retransmission Bitmap field.

The Sounding Dialog field 1310 includes a Broadcast OFDMA NDPA sub-field 1312, an OFDMA Sub-band Reporting sub-field 1314, and a Sounding Dialog Token Number sub-field 1316 that respectively operate as described for the Broadcast OFDMA NDPA sub-field 1112, OFDMA Sub-band Reporting sub-field 1114, and a Sounding Dialog Token Number sub-field 1116 shown in FIG. 11.

In an embodiment, the frame body 1320 also includes one or more STA info fields, each similar to the STA info field 920 of FIG. 9.

FIG. 14 illustrates a Media Access Control (MAC) frame 1400 including High Efficiency (HE) fields according to an embodiment, which may be used to report the results of an OFDMA sub-band CSI determination. The MAC frame 1400 is a modification of a MAC frame described in § 8.2 of IEEE Std 802.11ac, and includes a High Throughput (HT) Control field 1430 and an HT Control Middle field 1450 that are modifications of a VHT variant HT Control field and a VHT variant HT Control Middle field described in §§ 8.2.4.6 through 8.2.4.6.3 of that standard, respectively.

A bit in the HT Control middle field 1450 of the MAC frame 1400, denoted as an HE Control Extension Indication field 1452, is used to indicate the extension of HTC field and addition of HE Control Extension. When the HE Control Extension Indication field 1452 has a first value, for example, a value of "1", the HT Control field 1430 includes an HE Control Extension (HECE) field 1432.

The HECE field 1432 may include OFDMA sub-band CSI including one or more of the information shown in Table 1, below. The information shown in Table 1 may be included in the HECE field 1432 for each of selected sub-band, each of a plurality of adjacent of sub-bands, each of a plurality of combinations of a sub-band and a plurality of receiving antennas, transmitting antennas, or both, and the like.

TABLE 1

| | HECE Information |
|---|---|
| ULDL | Indicates whether the report is for downlink (DL) OFDMA or uplink (UL) OFDMA. |
| BW | Bandwidth of the frequency segment for which OFDMA sub-band CSI was determined |
| NDPA SDTN | Sounding Dialog Token Number from the NDPA or other frame that requested the OFDMA sub-band CSI. |
| Sub-band resolution | Bandwidth covered by each reported CSI. |
| MCS per sub-band | Modulation and Coding Scheme for each sub-band |
| NSS per sub-band | Number of special streams for each sub-band |
| Queue Size per AC | Queue size per Access Category |
| Queue Size per TID | Queue size per Traffic Identifier |

Figure 15:
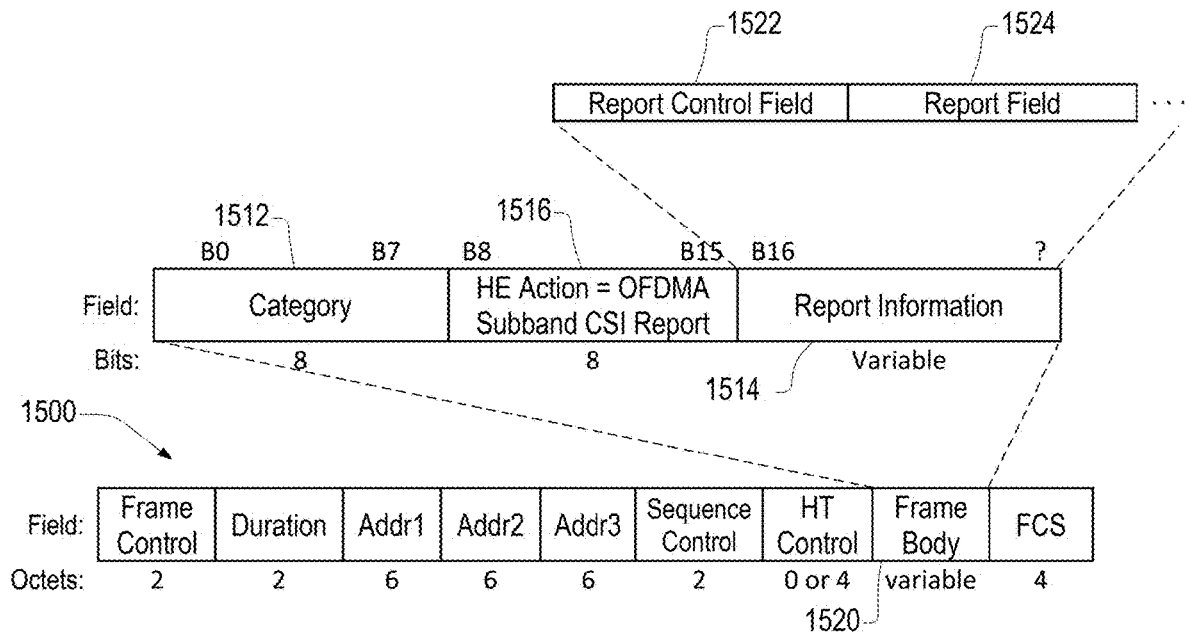
FIG. 15 illustrates a frame format for reporting OFDMA sub-band CSI according to an embodiment.

FIG. 15 illustrates an OFDMA CSI Report frame 1500 for reporting OFDMA sub-band CSI according to another embodiment. The OFDMA CSI Report frame 1500 is a management frame in the format Action frame or an Action No ACK frame as described in § 8.3.3.13 or § 8.3.3.14, respectively, of IEEE Std 802.11-2012. In addition to the fields shown, the OFDMA CSI Report frame 1500 may include a QoS Control field.

A frame body 1520 of the OFDMA CSI Report frame 1500 includes an Category field 1512 and an HE Action field 1516 indicating that the frame is an OFDMA Subband CSI Report. The frame body 1520 further includes a Report Information field 1514 including one or more of the information shown in Table 1, above. The information shown in Table 1 may be included in the Report Information field 1514 for each of selected sub-bands, each of a plurality of adjacent sub-bands, each of a plurality of combinations of a sub-band and a plurality of receiving antennas, transmitting antennas, or both, and the like.

The Report Information field 1514 include two fields: (1) a Report Control field 1522, and (2) a Report field 1524 that has Report Value for all sub-bands.

The Report Control field 1522 may include, among others, the following sub-fields: Sub-band Report BW (2 MHz, 4 MHz, 8 MHz, 10 MHz, 20 MHz, 40 MHz, 80 MHz, or 80+80/160 MHz), Report Type (SINR, MCS, NSS, RSSI), and DLUL Report (DL Report, UL Report, i.e. whether the Report field is DL Report or UL Report). In an embodiment, the Report Control field 1522 also includes a Report Value Length indication a length of the Report Field 1524.

The Report field includes the Report Value for each sub-band. In an embodiment, a length of the Report Value may be predetermined. In another embodiment, the length of the Report Value is indicated in the corresponding Report Control field. Given the Sub-band Report BW, the number of Report Values are a priori known.

There might be more than one Report Information field 1514, which results in having more than one pair of Report Control field 1522 and Report field 1524. For instance, there might be one Report Control field 1522 and Report field 1524 for MCS and another Report Control field 1522 and Report field 1524 for NSS, and/or another Report Control field 1522 and Report field 1524 for SINR. In another embodiment, a Report Value might have combined reports e.g. MCS and NSS all within one Report Value sub-field but with a known bit boundaries such that the recipient of the report would distinguish and extract MCS and NSS reports separately. In such multiple report cases, there would be a designated indication within Report Type. For instance the Report Type would indicate (SINR, MCS, NSS, MCS+NSS, SINR+MCS, RSSI+NSS, and other possible combinations).

In some embodiments, the Report field 1524 includes an extra sub-field, named Queue Size, to indicate the queue size of all or each Access Category (AC) at the STA side. The Report Control field 1514 includes an indicator to indicate the presence of the queue size sub-field, wherein the indicator being set to a TRUE value indicates the presence of Queue Size sub-field within the Report field, otherwise the indicator being set to FALSE value indicates that the Queue Size sub-field is not present. If the STA does not want to report any queue size a reserved value is used, such as setting the sub-field to all-zero or all-one.

The Queue Size sub-field has a length of 1 or 2 octet(s) and indicates the total queue size of all ACs, in units of a pre-determined number of Bytes, or it might have four sub-fields each indicating the queue size of respective ACs in units of a pre-determined number of Bytes.

In some embodiments, the OFDMA CSI Report frame 1500 might appear in two forms: an OFDMA CSI Report Request and an OFDMA CSI Report Response. In the OFDMA CSI Report Request, only the Report Control field is present and the Report field is not present, while in the OFDMA CSI Report Response both of the fields are present. In some embodiments, the OFDMA CSI Report Request and the OFDMA CSI Report Response are distinguished by a sub-field in the Report Control field, where this sub-field is denoted by Request/Response that indicates that the frame is the OFDMA CSI Report Request when it is set to a REQUEST value and indicates that the frame is the OFDMA CSI Report Response when it is set to a RESPONSE value.

Figure 16:
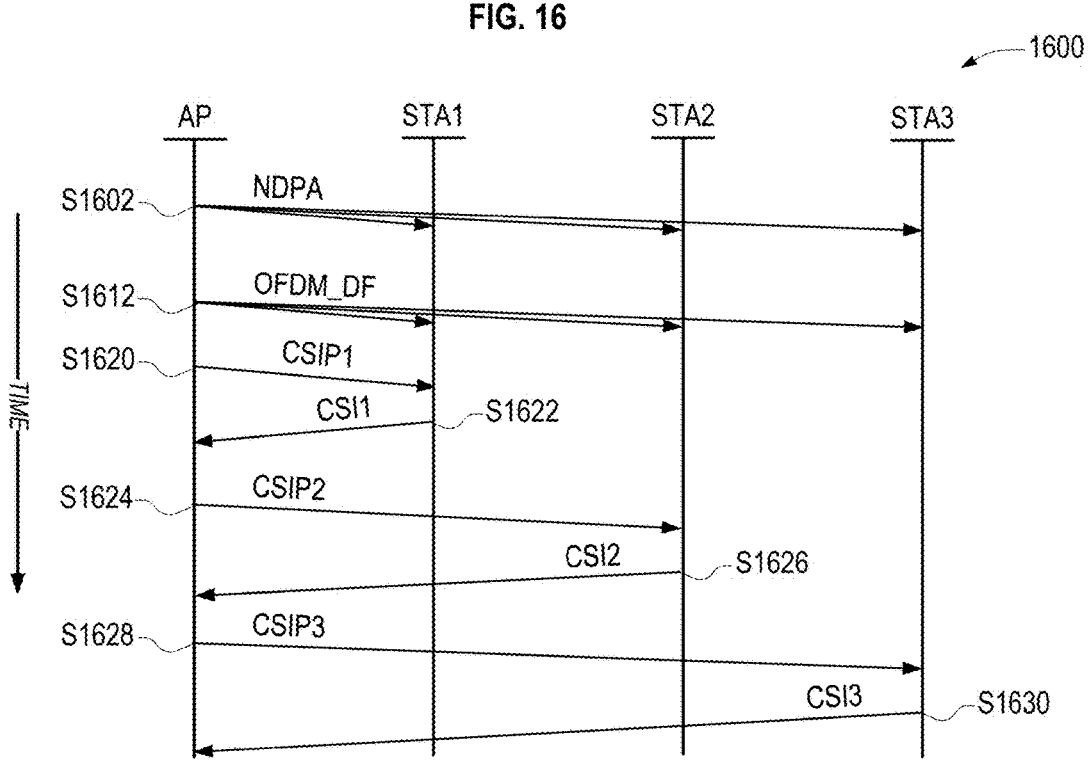
FIG. 16 illustrates an AP-initiated channel sounding process according to another embodiment.

FIG. 16 illustrates an AP-initiated channel sounding process 1600 according to another embodiment. In the illustrated example, a BSS includes an AP and first, second, and third OFDMA-capable stations STA1, STA2, and STA3. In the process 1600, an OFDM transmitted for another purpose, such as, for example, a MAC data frame, a MAC control frame, or a MAC management frame, is also used for OFDMA sub-band sounding.

At S1602, the AP transmits a Null Data Packet Announcement (NDPA) frame to all of stations STA1, STA2, and STA3. The NDPA frame is transmitted at a widest allowable bandwidth, wherein the widest allowable bandwidth is the widest bandwidth that can be transmitted by the AP, received by the stations in the BSS, and sensed by active channel sensing used, for example, for Clear Channel Assessment (CCA).

The NDPA frame includes an indication that a subsequent OFDM downlink frame transmitted by the AP, such as an OFDM NDP frame or a control or data frame with one or multiple LTF symbols, is to be used by one or more of the stations STA1, STA2, and STA3 as a sounding frame to determine OFDMA sub-band CSI. The NDPA frame may also include an indication of whether each station is to provide solicited or unsolicited reporting of the OFDMA sub-band CSI.

To designate which stations are to determine the OFDMA sub-band CSI, the NDPA frame may include one or more addresses or identifiers respectively corresponding to stations in the BSS, an identifier of a previously established group of stations in the BSS, or an indication corresponding to all of the stations in the BSS.

In an embodiment, the NDPA frame may further include parameters for use in determining and reporting the OFDMA sub-band CSI. The parameters may include one or more of a bandwidth resolution and an indication of one or more sub-bands to be reported on or not reported on.

At S1612, the AP transmits the OFDM downlink (OFDM_DF) frame to be used as the sounding frame for OFDMA sub-band sounding. The OFDM_DF frame may be an OFDM NDP frame or a control or data frame with one or multiple LTF symbols, for example, a MAC data frame, a MAC control frame, or a MAC management frame transmitted for another purpose as well as for OFDMA sub-band sounding. The OFDM_DF frame is transmitted at the same widest allowable bandwidth as the NDPA frame was at S1602.

The stations STA1, STA2, and STA3 each determine respective OFDMA sub-band CSI using the OFDM_DF frame. In an embodiment, the stations STA1, STA2, and STA3 determine the OFDMA sub-band CSI using an LTF symbol such as VHT-LTF or HE-LTF symbol of the OFDM_DF frame.

In some embodiments, the OFDM_DF frame includes a Sounding_Allowed indicator in its HE SIG-A or HE SIG-B symbol. The Sounding_Allowed indicator indicates whether channel sounding based on HE LTF symbols is allowed. When the LTF symbols are beamformed to a specific STA, the OFDMA sounding procedure performed by other STAs based on the beamformed LTF symbols would not be accurate and in this case the AP shall set the Sounding_Allowed indicator to a FALSE value. In some embodiments, the OFDM_DF frame may be in an OFDMA format with the Sounding_Allowed indicator set to a TRUE value and HE LTF symbols are not beamformed.

In an embodiment, the LTF symbols of a Trigger frame (a HE frame that is sent to a set of stations to trigger simultaneous transmission of a response frame by the set of stations or by a subset of the stations) is used to perform OFDMA sounding procedure. In such case, the Trigger frame may be sent in an OFDMA format to a set of stations, and may be a broadcast frame to all the associated stations, and the Sounding_Allowed indicator is set to allow the recipient stations to perform sounding.

Some of the stations, which are addressed in the Trigger frame, may send an OFDMA CSI Report frame 1500 as part of an immediate response to the Trigger frame (i.e. the OFDMA CSI Report frame is either sent as an MPDU in an A-MPDU of possibly other control, management or data frames, or a OFDMA CSI Report frame might be sent as a single MDPU). This means that the responding stations send the OFDMA CSR Report frame, possibly along with other (data, management or control) frames, in an UL OFDMA or UL MU-MIMO frame (where each station uses the sub-band or resource units assigned to the station as announced in the preceding Trigger frame).

Some other stations might later send an OFDMA CSI Report frame 1500 as a separate management frame or as an MPDU within an A-MPDU. In one embodiment, a special Trigger frame might be used to seek OFDMA CSI Report frames from the identified stations (or a set of stations identified by a group-identification). In another embodiment, in addition to an OFDMA CSI Report frame a station might provide its queue size per Access Category (AC) or per all ACs within a QoS Control field or within the Queue Size sub-field of the CSI Report frame.

At S1620, the AP transmits a first OFDMA sub-band CSI poll frame CSIP1, to the first station STA1. In an embodiment, the first OFDMA sub-band CSI poll frame CSIP1 is instead an OFDMA sub-band CSI Request frame.

At S1622, in response to the first OFDMA sub-band CSI poll frame CSIP1, the first station STA1 transmits a first OFDMA sub-band CSI report frame CSI1 to the AP. The first OFDMA sub-band CSI report frame CSI2 is a solicited report, and includes OFDMA sub-band CSI determined by the first station STA1 according to the NDPA frame of S1602 and the OFDM_DF frame of S1612.

At S1624, the AP transmits a second OFDMA sub-band CSI poll frame CSIP2 to the second station STA2. In an embodiment, the second OFDMA sub-band CSI poll frame CSIP2 is instead an OFDMA sub-band CSI Request frame.

At S1626, in response to the second OFDMA sub-band CSI poll frame CSIP2, the second station STA2 transmits a second OFDMA sub-band CSI report frame CSI2 to the AP. The second OFDMA sub-band CSI report frame CSI2 is a solicited report, and includes OFDMA sub-band CSI determined by the second station STA2 according to the NDPA frame of S1602 and the OFDM_DF frame of S1612.

At S1628, the AP transmits a third OFDMA sub-band CSI poll frame CSIP3 to the third station STA3. In an embodiment, the third OFDMA sub-band CSI poll frame CSIP2 is instead an OFDMA sub-band CSI Request frame.

At S1630, in response to the third OFDMA sub-band CSI poll frame CSIP3, the third station STA3 transmits a third OFDMA sub-band CSI report frame CSI3 to the AP. The third OFDMA sub-band CSI report frame CSI3 is a solicited report, and includes OFDMA sub-band CSI determined by the second station STA2 according to the NDPA frame of S1602 and the OFDM_DF frame of S1612.

In an embodiment, OFDMA sub-band CSI report frames may be MAC frames including OFDMA sub-band CSI in a High Efficiency Control Extension (HECE) field of a High Throughput Control (HT Control) field. In an embodiment, OFDMA sub-band CSI report frames may be an Action or Action No ACK frames including an Action field indicating that the frame is an OFDMA sub-band CSI report frame.

In some embodiments, the sequence of NDPA frame and OFDM_DF frame in FIG. 16 can be replaced by a single frame such as a single Trigger frame. A Trigger frame has the role of polling several stations to participate in an Up Link Multi-User (UL MU) transmission, such as UL OFDMA. The stations participate in the UL MU by sending data frames or specific control or management frames in an UL MU PPDU format (i.e. UL OFDMA or UL MU-MIMO format).

In such embodiments, the AP indicates a set of STAs in a Trigger frame by indicating the RA or other IDs of the STAs along with other information such as the sub-band that each STA would use in the upcoming UL OFDMA frame.

The AP sends the Trigger frame in an OFDM format. The Trigger frame may include multiple HE LTF symbols (where an indicator in an HE SIG-A or HE SIG-B symbol of the Trigger frame indicates the number of HE LTF symbols present in the frame). The AP may set a Sounding_Allowed indicator of the Trigger frame to a TRUE value to direct the indicated STAs to perform sounding based on the HE LTF symbols within the Trigger frame.

The indicated STAs would then participate in the UL OFDMA or UL MU MIMO frame and send the OFDMA sub-band CSI report either in a High Efficiency Control Extension (HECE) field of a High Throughput Control (HT Control) field of the MAC header of the frame they send to the AP (such as shown in FIG. 14), or as a management frame such as the OFDMA CSI Report frame shown in FIG. 15. In some embodiments, some of the indicated stations would include Queue Size sub-field within OFDMA CSI Report. In some embodiments, the indicated stations respond with data, control, or management frames within an A-MPDU where one of the MPDUs is the OFDMA CSI Report.

The AP determines an allocation of sub-bands to stations participating in the MU transmission according to the information included in the first, second, and third OFDMA sub-band CSI report frames CSI1, CSI2, and CSI3.

Figure 17:
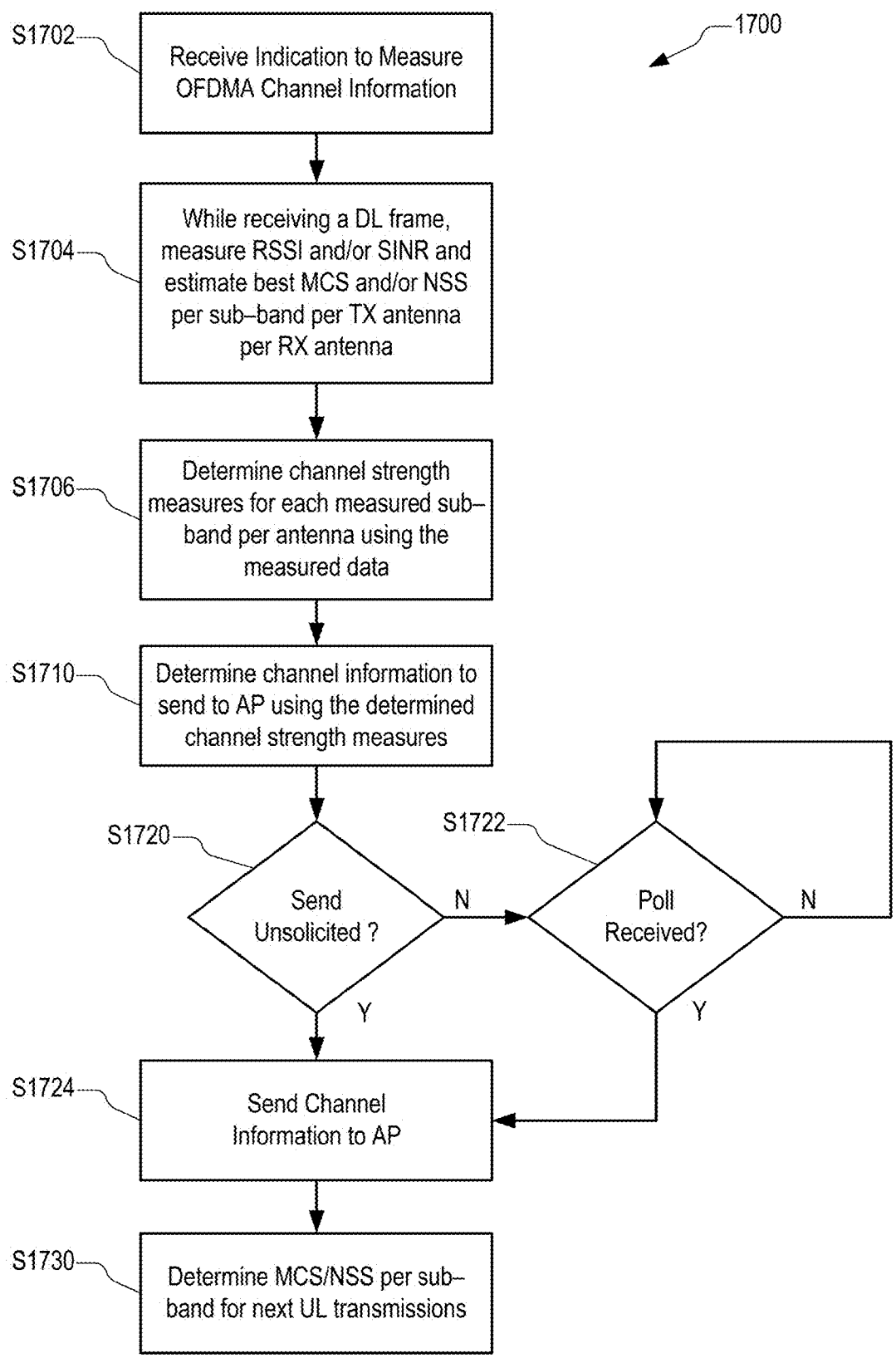
FIG. 17 illustrates a process of determining OFDMA sub-band CSI in a station according to another embodiment.

FIG. 17 illustrates a process 1700 of determining OFDMA sub-band CSI in a station according to an embodiment.

At S1702, the station receives an indication that OFDMA sub-band CSI is to be determined. The indication may be received in an NDPA frame, an Action frame or an Action No ACK frame addressed to the station, addressed to a group the station is included in, or addressed to all the stations in the BSS. The NDPA, Action, or Action No ACK frame including the indication at OFDMA sub-band CSI is to be determined may be transmitted by an AP.

At S1704, the station measures one or more characteristics of a channel between a transmitter of a downlink frame, such as the AP, and the station. The station measures the channel characteristics using one or more fields of the downlink frame, such as, for example, an LTF symbol, e.g., VHT-LTF or HE-LTF symbols.

In an embodiment, the downlink frame may be a NDP transmitted using a frequency segment having a widest allowable bandwidth. In an embodiment, the downlink frame may be a MAC Control frame, a MAC Data frame, or a MAC Management frame transmitted using the frequency segment having the widest allowable bandwidth. The widest allowable bandwidth is a widest bandwidth that can be transmitted across its entirety by the transmitter, received across its entirety by the stations in the BSS, and sensed across its entirety by active channel sensing.

In an embodiment, the station may measure only some of the sub-bands within the frequency segment. The sub-bands to be measured may be determined using an indication in the received NDPA, Action, or Action No ACK frame that included the indication that OFDMA sub-band CSI was to be determined. In an embodiment, the received indication of which sub-bands to measure may include an indication determined according to a prior allocation of one or more sub-bands to one or more other stations. In an embodiment, the received indication of which sub-bands to measure may be determined according to prior OFDMA sub-band CSI provided by the station.

The measurements taken for each sub-band may include a Received Signal Strength Indication (RSSI), a Signal to Interference and Noise Ratio (SINR), an estimated best Modulation and Coding Scheme (MCS), and a Number of Spatial Streams (NSS). In an embodiment, measurements for each of a plurality of subcarriers of each sub-band are combined to determine a respective measurement for each sub-band.

The measurements for each sub-band may be taken for each of a plurality of transmitting antennas when the downlink frame is transmitted using the plurality of transmitting antennas. The measurements for each sub-band may be taken for each of a plurality of receiving antennas when the downlink frame is received using the plurality of receiving antennas.

At S1706, the station determines the channel strength measures for each measured sub-band. In an embodiment, the channel strength measures for each measured sub-band are determined for each transmitting antenna, for each receiving antenna, or for each combination of a transmitting antenna and a receiving antenna.

Determining the channel strength measures for each measured sub-band may include computing a metric using one or more of an RSSI, an SINR, an MCS, and an NSS. The metric may be normalized to indicate relative channel information between the measured sub-bands.

At S1710, the station determines the OFDMA sub-band CSI to be reported. Determining the OFDMA sub-band CSI to be reported may include one or more of combining and omitting information associated with the measured sub-band.

In an embodiment, the station may determine the OFDMA sub-band CSI to be reported according to a policy received in the received NDPA, Action, or Action No ACK frame that included the indication that OFDMA sub-band CSI was to be determined. In an embodiment, the station may determine the sub-band CSI to be reported according to an internal policy of the station.

Determining the OFDMA sub-band CSI to be reported may include combining measurements. The measurements to be combined may be measurements from adjacent sub-bands, measurements associated with different antennas, or both.

In an embodiment, measurements for a plurality of adjacent sub-bands are combined into a single measurement when a measurement bandwidth resolution or the requested resolution for the measurement is greater than the combine bandwidths of the plurality of adjacent sub-bands. In an embodiment, the station may determine to combine measurements for a plurality of adjacent sub-bands when a difference or a ratio between one or more respective measurements of the adjacent sub-bands is less than one or more respective predetermined thresholds.

In an embodiment, measurements for a plurality of transmitting antennas, receiving antennas, or both, may be combined into a single measurement. In an embodiment, the station may determine to combine measurements for a plurality of transmitting antennas when a difference or a ratio between one or more respective measurements of the antennas is less than one or more respective predetermined thresholds.

Determining the OFDMA sub-band CSI to be reported may include determining which sub-bands to report on. In an embodiment, the sub-bands to be reported may be determined according to an indication of which sub-bands to report on included in the NDPA, Action, or Action No ACK frame that included the indication that OFDMA sub-band CSI was to be determined.

In an embodiment, the sub-bands to be reported may be determined by the station according to a reporting policy of the station. The reporting policy may control which sub-band CSI is reported according to prior CSI reported for each sub-band, according to a suitability evaluation for each sub-band, or both.

In an embodiment, the station may only report a sub-band when the current CSI of the sub-band is substantially different from previously reported CSI for the sub-band.

In an embodiment, the current CSI of the sub-band may be substantially different from the previously reported CSI for the sub-band when, for example, one or more of a current RSSI, SINR, MCS, NSS, and channel strength measure differ from a respective one or more previously reported RSSI, SINR, MCS, NSS, and channel strength measure by a respective predetermined value.

In an embodiment, the current CSI of the sub-band may be substantially different from the previously reported CSI for the sub-band when, for example, a ratio of one or more of a current RSSI, SINR, MCS, NSS, and channel strength measure to a respective one or more previously reported RSSI, SINR, MCS, NSS, and channel strength measure is greater than or less than a respective predetermined value.

In an embodiment, the sub-bands to be reported may be determined by the station according to the suitability of each sub-band for transmitting frames to the station. In an embodiment, the CSI of a sub-band is reported only when one or more of the RSS, SINR, MCS, NSS, and channel strength measure meets a respective criteria. For example, a CSI of a sub-band may only be reported when the SINR exceeds a predetermined value, the MCS is one of a plurality of preferred modulation and coding schemes, the relative signal strength is within a predetermined top percentile of the relative signal strengths of the measured sub-bands, or a combination of these criteria.

At S1720, the station determines whether the OFDMA sub-band CSI is to be sent unsolicited, i.e., without a targeted instruction from the AP to the station. In an embodiment, the OFDMA sub-band CSI is sent unsolicited when the downlink frame used to perform the channel measurements is an NDP frame and the station is the first or only station indicated as performing channel measurements using the downlink frame.

In an embodiment, the frame used to perform channel measurement includes an indication whether the OFDMA sub-band CSI is to be sent unsolicited (that is, as a response to the frame used to perform channel measurement) or as a response to a subsequent poll frame. In another embodiment, an announcement frame used to pre-announce the frame used to perform channel measurement includes the indication whether the OFDMA sub-band CSI is to be sent as a response to the frame used to perform channel measurement or as a response to a subsequent poll frame.

When the OFDMA sub-band CSI is not to be sent unsolicited, at S1722 the station waits for a poll frame to be received.

When the OFDMA sub-band CSI is to be sent unsolicited or after a poll frame is received, at S1724 the station transmits the OFDMA sub-band CSI. In an embodiment, the station transmits the OFDMA in an Action or Action No ACK frame having an Action field with a value indicating that OFDMA sub-band CSI is being reported.

In an embodiment, the station transmits the OFDMA sub-band CSI to be reported in an uplink frame having an HT Control field including a High Efficiency Control Extension field including the reported OFDMA sub-band CSI and an indication that OFDMA sub-band CSI is being reported.

At S1730 the station uses the OFDMA sub-band CSI to determine an MCS, an NSS, or both for a subsequent uplink (UL) transmission.

Figure 18A:
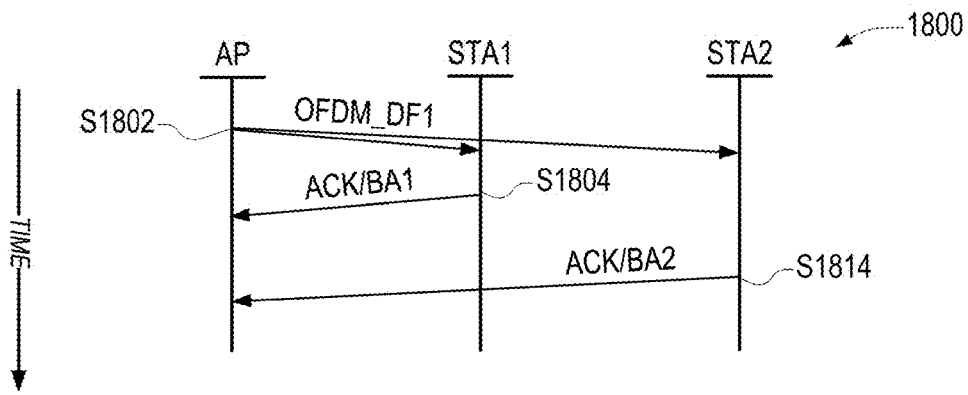
FIG. 18A illustrates a station-initiated OFDMA sub-band sounding process according to an embodiment.
Figure 18B:
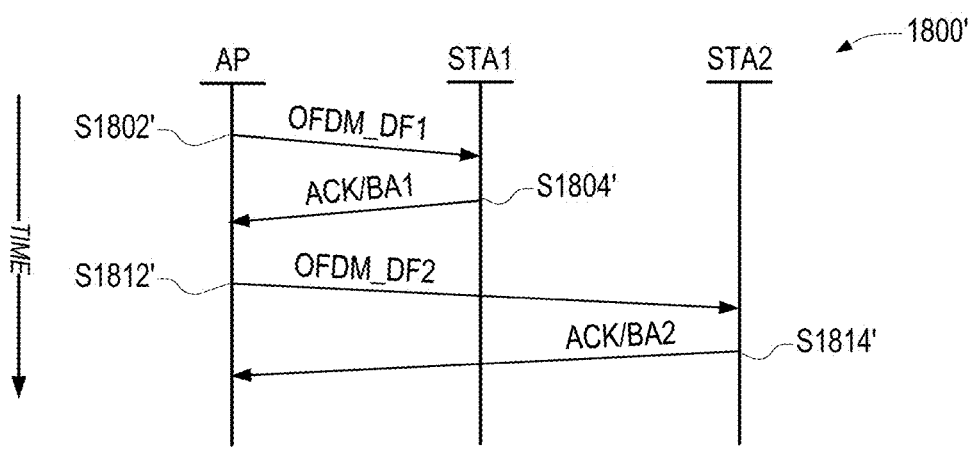
FIG. 18B illustrates a station-initiated OFDMA sub-band sounding process according to an embodiment.

In another set of embodiments that are shown in FIG. 18A and FIG. 18B, one or more DL data frames are sent by the AP to a station STA and subsequently the AP receives ACK or BA responses from the station STA regarding the previously sent DL data frames. The DL data frames may include an OFDM frame or a multi-user frame, such as an OFDMA frame, where the AP expects to receive ACK/BA frames from the intended stations, including the station STA, addressed in the previously sent multiuser or OFDMA frame.

In a process disclosed herein, the station STA may send the ACK or BA frames using specific formats that may be used by the AP to determine information than can be used to enhance subsequent DL or UL OFDMA frames scheduled by the AP for a group of stations including the station STA.

If the AP and station STA are engaged in Single User (SU) transmission then this new process happens between the AP and the station STA. The AP transmits a Block Ack Request (BAR) frame in a specific format described herein. The station STA responds with an ACK or BA frame in a specific format that mirrors, that is, is transmitted in the same bandwidth as, the initial BAR frame.

In another embodiment, wherein the AP does not transmit a BAR frame, the station STA responds with ACK or BA in a specific format that mirrors that is, is transmitted in the same bandwidth as, the preceding DL frame.

If the AP and several stations are engaged in a DL MU transmission (such as an 802.11ac DL MU MIMO transmission or an 802.11ax DL OFDMA transmission) then this new process happens between the AP, which sends a BAR frame for each station in a specific format described here, and each of the stations that responds with an ACK or BA frame in a specific format that mirrors the initial BAR frame.

Figure 19:
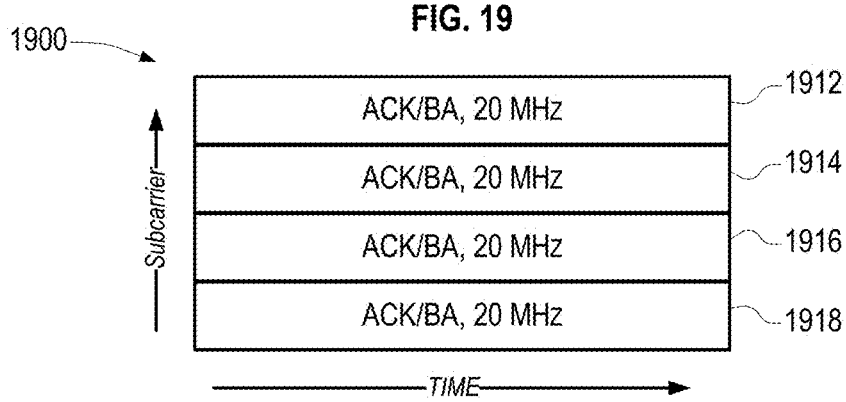
FIG. 19 illustrates a format of a frame used in a station-initiated OFDMA sub-band sounding process according to an embodiment.

FIGS. 18A and 18B shows that the stations respond with ACK or BA frames in non-HT duplicated format such as that shown in FIG. 19, which is shown for 80 MHz bandwidth. The duplication structure of FIG. 19 can be applied for non-HT duplicated formats with bandwidths of 40 MHz, 80 MHz, 160 MHz or 80+80 MHz. However, embodiments are not limited to that shown in FIG. 19, and the stations may transmit ACK/BA frames in HT, VHT or HE formats with a bandwidth of 40 MHz, 80 MHz, 160 MHz or 80+80 MHz.

In an embodiment, when an AP transmits a BAR frame to a station STA to poll for a ACK/BA response from that station STA, the AP sends the BAR frame in non-HT duplicated format (such that shown in FIG. 19). The duplication structure of FIG. 19 can be applied for non-HT duplicated format with bandwidths of 40 MHz, 80 MHz, 160 MHz or 80+80 MHz.

FIG. 18A illustrates a station-initiated OFDMA sub-band sounding process 1800 according to an embodiment. In the illustrated example, a BSS includes an AP and first and second OFDMA-capable stations STA1 and STA2.

At S1802, the first and second stations STA1 and STA2 receive a first OFDM frame OFDM_DF1 from the AP. The first OFDM frame OFDM_DF1 may include one or more of a MAC Control Frame, a MAC Data frame, or a MAC Management frame. In an embodiment, the first OFDM frame OFDM_DF1 is a BAR frame. The first OFDM frame OFDM_DF1 may be transmitted at a widest allowable bandwidth, as previously described.

In an embodiment, the first OFDM frame OFDM_DF1 may include an indication that OFDMA sub-band sounding is requested. In an embodiment, the first OFDM frame OFDM_DF1 is used as a sounding frame by the first and second stations STA1 and STA2.

At S1804, the first station STA1 transmits a first ACK (or Block ACK) frame ACK/BA1 in response to the first OFDM frame OFDM_DF1. The first ACK frame ACK/BA1 is an OFDM frame.

Instead of transmitting the first ACK frame ACK/BA1 at a minimum required bandwidth, the first station STA1 transmits the first ACK frame ACK/BA1 at the widest allowable bandwidth. When the widest allowable bandwidth is wider than a minimum bandwidth of a frequency segment, the first ACK frame ACK/BA1 may include information duplicated across the widest allowable bandwidth, and the first ACK frame ACK/BA1 may include bandwidth indicators. The first ACK frame ACK/BA1 may include a non-HT duplicated frame.

The AP determines first OFDMA sub-band CSI for a first channel between the AP and the first station STA1 using the first ACK frame ACK/BA1, e.g., by using one or more of an RSSI, a SINR, and MCS, and an NSS of the first ACK frame ACK/BA1.

At S1814, the second station STA2 transmits a second ACK (or Block ACK) frame ACK/BA2. The second ACK frame ACK/BA2 is an OFDM frame.

The second station STA2 transmits the second ACK frame ACK/BA2 at the widest allowable bandwidth. When the widest allowable bandwidth is wider than a minimum bandwidth of a frequency segment, the second ACK frame ACK/BA2 may duplicate information across the widest allowable bandwidth, and the second ACK frame ACK/BA2 may include bandwidth indicators. The second ACK frame ACK/BA2 may include a non-HT duplicated frame.

The AP determines second OFDMA sub-band CSI for a second channel between the AP and the second station STA2 using the second ACK frame ACK/BA2, e.g., by using one or more of an RSSI, a SINR, and MCS, and an NSS of the second ACK frame ACK/BA2. The AP then allocates sub-bands to the stations in the BSS using the first and second OFDMA sub-band CSI.

In an embodiment, the second station STA2 transmits the second frame ACK/BA2, e.g., according to carrier sense multiple access with collision avoidance (CSMA/CA) protocol. For example, the second station STA2 transmits the second frame ACK/BA2 in response to the first OFDM frame received at S1802.

Alternatively, the second station STA2 may transmit the second frame ACK/BA2 after receiving a second OFDM frame OFDM_DF2 from the AP at S1812' (see FIG. 18B). The second OFDM frame OFDM_DF2 may include one or more of a MAC Control Frame, a MAC Data frame, or a MAC Management frame. The second OFDM frame OFDM_DF2 may be transmitted at the widest allowable bandwidth, as previously described. In an embodiment, the second OFDM frame OFDM_DF2 may include an indication that OFDMA sub-band sounding is requested. In an embodiment, the second OFDM frame OFDM_DF2 is used as a sounding frame by the second station STA2.

FIG. 19 illustrates a frame 1900 suitable for use in a station-initiated OFDMA sub-band sounding process, such as the OFDMA sub-band sounding process 1800 of FIGS. 18A and 18B, according to an embodiment. The frame 1900 is an OFDM uplink frame.

The frame 1900 is transmitted at a widest available bandwidth, which in the embodiment of FIG. 19 is 80 MHz.

The frame 1900 includes a ACK/BA frame 1918 having a 20 MHz bandwidth and first, second, and third duplicate ACK/BA frames 1912, 1914, and 1916 each occupying additional respective 20 MHz bandwidths. The first, second, and third duplicate ACK/BA frames 1912, 1914, and 1916 include are identical in content to the ACK/BA frame 1918, and are used to duplicate the ACK/BA frame 1918 across the 80 MHz widest allowable bandwidth of the frame 1900.

In an embodiment, the frame 1900 may be in a legacy non-HT duplicated format. In an embodiment, the frame 1900 may be in a VHT or HE format, in which case no explicit duplication is needed.

Figure 20:
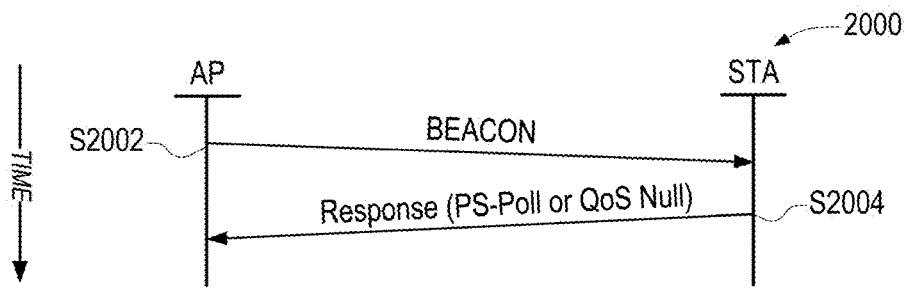
FIG. 20 illustrates a station-initiated OFDMA sub-band sounding process according to another embodiment.

FIG. 20 illustrates a station-initiated OFDMA sub-band sounding process 2000 according to another embodiment.

At S2002, an AP transmits a beacon frame that is received by a station STA. The beacon frame may include an indication that the AP has a pending downlink (DL) payload for the station STA.

In response to the beacon frame, at S2004 the station STA that has been out of power-save (PS) mode transmits a response frame to the AP. The frame may include an IEEE Std 802.11-2012 Power Save (PS)-Poll frame or Quality of Service (QoS) Null frame.

Figure 21:
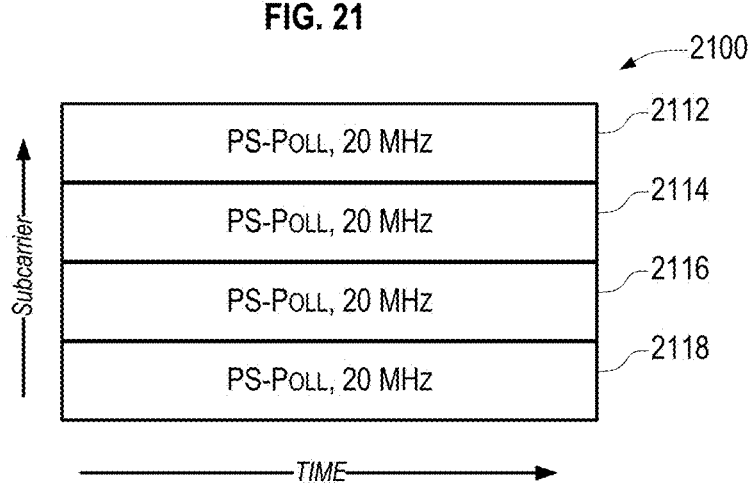
FIG. 21 illustrates formats of frames used in a station-initiated OFDMA sub-band sounding process according to another embodiment.

In the embodiments related to FIG. 20 and FIG. 21, the AP and STAs modify a IEEE 802.11™-2012 PS-Poll frame and an associated IEEE 802.11-2012 power management procedure to provide the AP with sub-band information over the largest bandwidth that both AP and STA are configured to operate over and that the condition of the wireless medium allows.

In the current procedures prescribed by the IEEE 802.11 specifications, a STA that has recently exited a power save mode sends a PS-Poll frame to the AP. The PS-Poll frame indicates to the AP that the STA is out of sleep mode and ready to receive one or more DL payloads associated with the STA. The AP acknowledges the reception of the PS-Poll frame and subsequently sends the DL payloads to the STA. In some cases, the AP may send the DL payload right after the reception of the PS-Poll frame.

In the modified PS-Poll procedure shown in FIG. 20 and FIG. 21, the STAs send PS-Poll frames in specific formats. The formats of the PS-Poll frames enable the AP to collects sub-carrier and/or sub-band information for the widest bandwidth possible.

The STA may send a PS-Poll frame in a non-HT duplicated format such that shown in FIG. 21, which is shown for 80 MHz bandwidth. However, embodiments are not limited thereto, and the duplication structure of FIG. 21 can be applied for non-HT duplicated formats with bandwidths of 40 MHz, 80 MHz, 160 MHz, or 80+80 MHz. In another embodiment, the PS-Poll frame is sent in a HT, VHT or HE format with a bandwidth of 40 MHz, 80 MHz, 160 MHz or 80+80 MHz.

The STA sends the PS-Poll frame in non-HT duplicate format with a CH_BANDWIDTH_IN_NON_HT parameter of the TXVECTOR set to indicate a 160 MHz or 80+80 MHz bandwidth when both the AP and the STA operate with the indicated bandwidth and secondary20, secondary40 and secondary80 channels are not sensed BUSY by the STA at a PIFS time before transmission of the frame.

In addition, when CH_BANDWIDTH_IN_NON_HT parameter of the TXVECTOR is set to larger than 20 MHz, the TA field value is the address of the STA transmitting the frame or a bandwidth signaling TA. When the PS-Poll frame is transmitted by a VHT or HE STA in a non-HT or non-HT duplicate format and a scrambling sequence of the PS-Poll frame carries the TXVECTOR parameter CH_BANDWIDTH_IN_NON_HT (such as the cases described above), the TA field value of the PS-Poll frame is a bandwidth signaling TA. When the ACK or BA frame transmitted by the STA in a non-HT or non-HT duplicate format and the scrambling sequence carries the TXVECTOR parameter CH_BANDWIDTH_IN_NON_HT, the TA field value is a bandwidth signaling TA.

In an embodiment, the ACK or BA frame may be sent in HT format when a CH_BANDWIDTH parameter value of the RXVECTOR is 40 MHz. The ACK or BA frame may be sent in VHT format when CH_BANDWIDTH parameter value of the RXVECTOR is 40 MHz, 80 MHz, 160 MHz, or 80+80 MHz. The ACK or BA frame may be sent in HE format when the CH_BANDWIDTH parameter value of the RXVECTOR is 40 MHz, 80 MHz, 160 MHz, or 80+80 MHz.

The station STA transmits the response frame at the widest allowable bandwidth. When the widest allowable bandwidth is wider than a minimum bandwidth of a frequency segment, the response frame may duplicate information across the widest allowable bandwidth, and the response frame may include bandwidth indicators. The response frame may include a non-HT duplicated frame.

The AP determines OFDMA sub-band CSI for a channel between the AP and the station STA using the response frame as a sounding frame. The AP then allocates sub-bands to the stations in the BSS using the OFDMA sub-band CSI.

FIG. 21 illustrates a frame 2100 that may be used in a station-initiated OFDMA sub-band sounding process according to an embodiment. The frame 2100 may be used as the response frame in the station-initiated OFDMA sub-band sounding process 2000 of FIG. 20.

The frame 2100 is transmitted at a widest available bandwidth, which in the embodiment of FIG. 19 is 80 MHz. The frame 2100 includes a PS-Poll frame 2118 having a bandwidth of 20 MHz, and first, second, and third duplicate PS-Poll frames 2112, 2114, and 2116. The PS-Poll frame 2118 may include an HECE field including an OFDMA sub-band CSI report.

The first, second, and third duplicate PS-Poll frames 2112, 2114, and 2116 are substantially identical in content to the PS-Poll frame 2118, and are used to duplicate the PS-Poll frame 2118 across the 80 MHz widest allowable bandwidth of the frame 2100.

Figure 22:
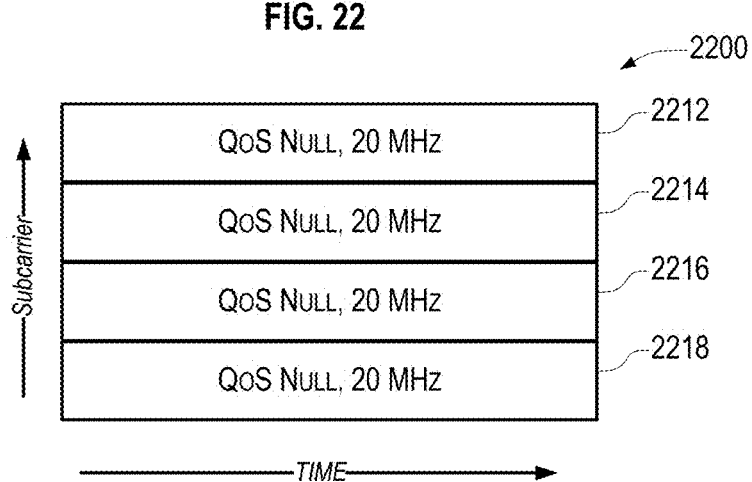
FIG. 22 illustrates formats of frames used in a station-initiated OFDMA sub-band sounding process according to another embodiment.

FIG. 22 illustrates a frame 2200 that may be used in a station-initiated OFDMA sub-band sounding process according to another embodiment. The frame 2200 may be used as the response frame in the station-initiated OFDMA sub-band sounding process 2000 of FIG. 20.

In the embodiments related to FIG. 22, the AP and STAs take advantage of QoS Null frame and procedure so that the AP gets the necessary sub-band information over the largest bandwidth that both AP and STA operate and the condition of the wireless medium allows. The STA sends the QoS-Null frame in non-HT duplicate format with CH_BANDWIDTH_IN_NON_HT parameter of the TXVECTOR set to 160 MHz or 80+80 MHz when both the AP and the STA operate with such bandwidth and secondary20, secondary40 and secondary80 channels are not sensed BUSY by the STA at PIFS time before transmission of the frame.

When the CH_BANDWIDTH_IN_NON_HT parameter of the TXVECTOR is set to larger than 20 MHz, the TA field value is the address of the STA transmitting the frame or a bandwidth signaling TA. When the QoS-Null frame transmitted by a VHT or HE STA in a non-HT or non-HT duplicate format and the scrambling sequence of the QoS-Null frame carries the TXVECTOR parameter CH_BANDWIDTH_IN_NON_HT (such as the cases described above), the TA field value is a bandwidth signaling TA.

The frame 2200 is transmitted at a widest available bandwidth, which in the embodiment of FIG. 20 is 80 MHz. The frame 2200 includes a Quality of Service (QoS) Null frame 2218, and first, second, and third duplicate QoS Null frames 2212, 2214, and 2216. The QoS Null frame 2218 may include an HECE field including an OFDMA sub-band CSI report.

The first, second, and third duplicate QoS Null frames 2212, 2214, and 2216 are substantially identical in content to the QoS Null frame 2218, and are used to duplicate the QoS Null frame 2218 across the 80 MHz widest allowable bandwidth of the frame 2200.

FIG. 23 illustrates a process 2300 of determining OFDMA CSI in an Access Point (AP) according to an embodiment. The process 2300 may be employed in a system using the OFDMA sub-band sounding process 1800 of FIGS. 18A and 18B, the OFDMA sub-band sounding process 2000 of FIG. 20, or both.

At S2302, the AP may transmit an indication that OFDMA sub-band sounding is to be conducted to one or more stations STAs. In another embodiment wherein a STA may initiate OFDMA sub-band sounding without an indication from the AP, the AP does not transmit an OFDMA sub-band sounding indication.

At S2304, the AP receives an uplink frame suitable for use in performing OFDMA sub-band sounding (such as, for examples, one of the frames illustrated in FIGS. 17, 18, and 20) from a station. The received uplink frame is a frame transmitted by the station at a maximum allowable bandwidth.

While receiving the uplink frame, the AP performs one or more of an RSSI measurement, a SINR measurement, an estimate of a best MCS, and an estimate of a best NSS for each sub-band of the maximum allowable bandwidth or for each combination of the sub-band and a transmitting antenna, a receiving antenna, or both.

At S2306, the AP determines relative sub-band strengths for the station for each sub-band or for each sub-band/antenna combination using one or more of the measured RSSI, the measured SINR, the estimated best MCS, and the estimated best NSS.

At S2308, the AP determines allocations of sub-bands to the station and transmission parameters for an OFDMA downlink frame being sent to the station according to the relative sub-band strengths for the station and the measured data. In an embodiment, the AP allocates a sub-band in the OFDMA downlink frame to the station when a relative sub-band strength of the sub-band for the station is higher than a relative sub-band strength of the sub-band to one or more other stations.

In above explanations and figures, illustrative embodiments were provided to allow a person of ordinary skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has been made to one or more IEEE Std 802.11 standards, the design is not limited to 802.11, and a person of ordinary skill in the art in light of the teachings and disclosures herein would understand how the present disclosures apply to any next-generation wireless operation that operates in licensed or unlicensed bands.

Embodiments of the present disclosure include electronic devices configured to perform one or more of the operations and/or to generate, decode, or both the frames described herein. The electronic devices may include wireless devices such as wireless device 200 shown in FIG. 2, including the AP 103 and stations 104 to 114 illustrated in FIG. 1. However, embodiments are not limited thereto.

Embodiments of the present disclosure may further include systems configured to operate using the processes and frames described herein. The systems may include basic service sets (BSSs) such as the BSS 100 of FIG. 1, but embodiments are not limited thereto.

Embodiments of the present disclosure may be implemented in the form of program instructions executable through various computer means and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless device 200 of FIG. 2.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. Further, two or more embodiments may be combined.

What is claimed is:

1. A method for communication in a wireless local area network, the method comprising:
   receiving a frame at a first device, the frame being transmitted by a second device;
   determining, by the first device using the frame, respective channel strengths for a plurality of sub-bands associated with a bandwidth of the frame;
   determining, by the first device, a sub-band Channel State Information (CSI) report according to the respective channel strengths, wherein determining the CSI report includes:
      determining, by the first device, whether an indication of which information is to be included in the sub-band CSI report has been received from the second device;
      when the first device determines that the indication has been received from the second device, determining the sub-band CSI report according to the received indication of which information is to be included in the sub-band CSI report and the respective channel strengths for the plurality of sub-bands;
      when the first device determines that the indication has not been received from the second device, determining the sub-band CSI report according to a policy of the first device and the respective channel strengths for the plurality of sub-bands;

receiving, by the first device, a soliciting frame that solicits a plurality of devices to respectively transmit a respective plurality of sub-band CSI reports in an Uplink (UL) Multi-User (MU) transmission; and transmitting, by the first device in response to the soliciting frame, the sub-band CSI report to the second device as part of the UL MU transmission, wherein the first and second devices communicate using a set of resources.

2. The method of claim 1, the method further comprising: receiving an announcement frame transmitted by the first device prior to receiving the frame, the announcement frame including the indication of which information is to be included in the sub-band CSI report.

3. The method of claim 2, wherein the announcement frame includes a Null Data Packet Announcement (NDPA) frame, and
wherein a Sounding Dialog Token field of the NDPA frame indicates that the channel strengths are for use in a subsequent OFDMA frame exchange.

4. The method of claim 2, wherein the first and second devices are part of a Basic Service Set (BSS), the first device being a station and the second device being an access point, and
wherein the announcement frame includes an indication that a group of one or more devices associated with the BSS are to determine respective channel strengths using the pre-announced frame.

5. The method of claim 2, wherein the announcement frame includes an indication of whether the sub-band CSI report is prepared using an average of channel strengths for a sub-band across multiple transmitting antennas, multiple receiving antennas, or combinations of multiple transmitting antennas and multiple receiving antennas.

6. The method of claim 1,
wherein the sub-band CSI report indicates the channel strength for each of a set of sub-bands of the plurality of sub-bands, and
wherein the set of resources is configured based on the sub-band CSI report received by the second device.

7. The method of claim 1, wherein the sub-band CSI report includes a combined strength determined using channel strengths of the plurality of sub-bands, and
wherein the set of resources is configured based on the combined strength.

8. The method of claim 1, wherein the sub-band CSI report includes a channel strength measure determined using channel strengths of the plurality of sub-bands, and
wherein the set of resources is configured based on the channel strength measure.

9. The method of claim 1, further comprising:
transmitting a sub-band CSI report including a first channel strength of the channel strengths for the sub-bands only when a previous frame received from the second device includes an indication that the sub-band CSI report is to include the first channel strength.

10. The method of claim 1, further comprising:
transmitting the sub-band CSI report in a field of a High Throughput (HT) Control field of a Medium Access Control (MAC) frame.

11. The method of claim 1, further comprising:
transmitting the sub-band CSI report in a management frame including an indication that the management frame includes the sub-band CSI report, wherein the management frame is an Action frame or an Action No ACK frame.

12. The method of claim 1, wherein the soliciting frame is a trigger frame.

13. The method of claim 1, wherein the bandwidth is a widest allowed bandwidth, the widest allowed bandwidth being a maximum bandwidth that can be received by the second device, transmitted by the first device, and sensed by the first and second devices during active channel sensing.

14. A first device for communicating in a wireless local area network, the first device comprising:
a memory; and
a processor, wherein the processor is configured to perform:
receiving a frame at a first device, the frame being transmitted by a second device,
determining, by the first device using the frame, respective channel strengths for a plurality of sub-bands associated with a bandwidth of the frame,
determining, by the first device, a sub-band Channel State Information (CSI) report according to the respective channel strengths, wherein determining the CSI report includes:
determining, by the first device, whether an indication of which information is to be included in the sub-band CSI report has been received from the second device;
when the first device determines that the indication has been received from the second device, determining the sub-band CSI report according to the received indication of which information is to be included in the sub-band CSI report and the respective channel strengths for the plurality of sub-bands, and
when the first device determines that the indication has not been received from the second device, determining the sub-band CSI report according to a policy of the first device and the respective channel strengths for the plurality of sub-bands;
receiving, by the first device, a soliciting frame that solicits a plurality of devices to respectively transmit a respective plurality of sub-band CSI reports in an Uplink (UL) Multi-User (MU) transmission, and
transmitting, by the first device in response to the soliciting frame, the sub-band CSI report to the second device as part of the UL MU transmission;
wherein the first and second devices communicate using a set of resources configured based on the channel strength determinations made using the frame.

15. The first device of claim 4, wherein the processor is further configured to perform:
receiving an announcement frame transmitted by the first device prior to receiving the frame, the announcement frame including the indication of which information is to be included in the sub-band CSI report.

16. The first device of claim 15, wherein the announcement frame includes a Null Data Packet Announcement (NDPA) frame, and
wherein a Sounding Dialog Token field of the NDPA frame indicates that the channel strengths are for use in a subsequent OFDMA frame exchange.

17. The first device of claim 15, wherein the first and second devices are part of a Basic Service Set (BSS), the first device being a station and the second device being an access point, and
wherein the announcement frame includes an indication that a group of one or more devices associated with the BSS are to determine respective channel strengths using the pre-announced frame.

18. The first device of claim 15, wherein the announcement frame includes an indication of whether the sub-band CSI report is prepared using an average of channel strengths for a sub-band across multiple transmitting antennas, multiple receiving antennas, or combinations of multiple transmitting antennas and multiple receiving antennas.

* * * * *